US006523398B1

(12) United States Patent
Hanai et al.

(10) Patent No.: US 6,523,398 B1
(45) Date of Patent: Feb. 25, 2003

(54) DIAGNOSIS APPARATUS FOR FUEL VAPOR PURGE SYSTEM

(75) Inventors: Shuichi Hanai, Toyota (JP); Shin Adachi, Toyota (JP); Tokiji Itoh, Toyota (JP); Yuichi Kohara, Toyota (JP); Noriyuki Iden, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/451,098

(22) Filed: Nov. 30, 1999

(30) Foreign Application Priority Data

Dec. 4, 1998 (JP) .......................................... 10-345656
Jun. 23, 1999 (JP) .......................................... 11-177242

(51) Int. Cl.[7] .............................................. G01M 19/00
(52) U.S. Cl. ..................................................... 73/118.1
(58) Field of Search .......................... 73/40, 49.2, 49.7, 73/118.1; 701/31; 123/519, 520

(56) References Cited

U.S. PATENT DOCUMENTS

| | | | | |
|---|---|---|---|---|
| 5,261,379 A | | 11/1993 | Lipinski et al. | 123/520 |
| 5,299,545 A | | 4/1994 | Kuroda et al. | 123/520 |
| 5,355,863 A | | 10/1994 | Yamanaka et al. | 123/520 |
| 5,363,828 A | | 11/1994 | Yamashita et al. | 123/520 |
| 5,408,866 A | * | 4/1995 | Kawamura et al. | 73/40 |
| 5,419,299 A | * | 5/1995 | Fukasawa et al. | 123/520 |
| 5,445,015 A | | 8/1995 | Namiki et al. | 73/118.1 |
| 5,490,414 A | | 2/1996 | Durschmidt et al. | 73/49.2 |
| 5,501,199 A | | 3/1996 | Yoneyama | 123/520 |
| 5,572,981 A | | 11/1996 | Pfleger et al. | 123/698 |
| 5,669,362 A | * | 9/1997 | Shinohara et al. | 123/520 |
| 6,105,556 A | * | 8/2000 | Takaku et al. | 123/520 |

FOREIGN PATENT DOCUMENTS

| | | |
|---|---|---|
| JP | 4-362264 | 12/1992 |
| JP | 6-42412 | 2/1994 |
| JP | 6-129311 | 5/1994 |
| JP | 6-159158 | 6/1994 |
| JP | 6-235354 | 8/1994 |
| JP | 6-249085 | 9/1994 |
| JP | 7-139439 | 5/1995 |
| JP | 8-61164 | 3/1996 |
| JP | 8-240161 | 9/1996 |
| JP | 9-32659 | 2/1997 |
| JP | 9-158793 | 6/1997 |
| JP | 9-242620 | 9/1997 |
| JP | 10-299587 | 11/1998 |

* cited by examiner

*Primary Examiner*—William Oen
(74) *Attorney, Agent, or Firm*—Pillsbury Winthrop LLP

(57) ABSTRACT

An improved diagnosis apparatus for detecting leakage of a fuel vapor purge system that purges fuel vapor from a fuel tank to an intake passage of an engine. The apparatus includes a pressure sensor and a purge valve. The pressure sensor detects the pressure in the purge system. The purge valve connects the purge system with the intake passage for lowering the purge system pressure to a predetermined pressure level. After the purge system pressure is lowered to the predetermined level, the purge system is sealed. The apparatus measures the rate of pressure change immediately after the purge system is sealed. The apparatus subsequently measures the rate of pressure change when the purge system pressure reaches a second reference pressure value and computes the ratio of the rates. The apparatus diagnoses whether there is a leak in the purge system based on the ratio and the rate of pressure change at the second reference pressure value.

18 Claims, 22 Drawing Sheets

| $Q_0-Q_B$ | ∫ -50g | -50g ∫ -20g | -20g ∫ 20g | 20g ∫ 50g | 50g ∫ |
|---|---|---|---|---|---|
| abnormality judgment | judgment cancellation | adjust boundary | valid | valid | judgment cancellation |
| normality judgment | judgment cancellation | invalid | valid | invalid | judgment cancellation |
| state of vehicle | going up hill | | level | going down hill | |

DIAGNOSIS APPARATUS FOR FUEL VAPOR PURGE SYSTEM

BACKGROUND OF THE INVENTION

The present invention relates to a diagnosis apparatus for a fuel vapor purge system, which supplies fuel vapor in a fuel tank to an intake system of an internal combustion engine.

Fuel vapor purge systems for sending fuel vapor in a fuel tank to an intake passage have been proposed. A typical fuel vapor purge system includes a canister, a vapor passage for connecting a fuel tank with the canister and a purge line for connecting the canister with an intake passage. The canister has an atmosphere valve through which the canister is exposed to the atmosphere. Fuel vapor in the fuel tank is collected by the canister. The collected fuel vapor is supplied to the intake passage through the purge line. A purge valve is located in the purge line to control the amount of fuel vapor supplied to the intake passage from the canister.

For example, Japanese Unexamined Patent Publication No. 4-362264 discloses a diagnosis apparatus for detecting leakage of fuel vapor through a puncture or a crack from a fuel vapor purge system. The diagnosis apparatus temporarily maintains a vacuum pressure in the purge system, or a pressure that is lower than atmospheric pressure. Then, the diagnosis apparatus observes changes of the purge system pressure over time thereby detecting whether there is a leak.

It is desirable that the diagnosis apparatus be able to quickly and accurately detect leakage through minute holes and cracks. However, the prior art diagnosis apparatuses cannot detect leakage through holes having a diameter that is smaller than 1.0 mm. Future regulations against pollution are likely to require that extremely small amount of vapor leakage be detected. Therefore, there is an increased demand for a diagnosis apparatus that detects holes smaller than 0.5 mm in diameter.

The diagnosis apparatus of Publication No. 4-362264 accurately detects vapor leakage only for a short period, for example, immediately after the engine is started. Further, when the amount of fuel in the fuel tank changes, the vapor pressure of the fuel changes the pressure in the purge system, which may cause the diagnosis apparatus to obtain erroneous diagnosis results.

SUMMARY OF THE INVENTION

Accordingly, it is a first objective of the present invention to provide a diagnosis apparatus that accurately and quickly detects fuel vapor leakage from a fuel vapor purge system. A second objective of the present invention to provide a diagnosis apparatus that frequently performs diagnosis.

To achieve the foregoing and other objectives and in accordance with the purpose of the present invention, this invention provides a diagnosis apparatus for a fuel vapor purge system. The purge system includes a fuel tank for storing fuel and supplies fuel vapor from the tank to an air-intake passage of an engine. The diagnosis apparatus determines whether the purge system has a malfunction. The apparatus includes a pressure sensor, a pressure changing means, and a diagnosis means. The pressure sensor detects the pressure in the purge system. The pressure changing means changes the purge system pressure to a predetermined level. The diagnosis means diagnoses the fuel vapor purge system. The diagnosis means closes the fuel vapor purge system after the purge system pressure has been changed by the operation of the pressure changing means. The diagnosis means measures a first rate of pressure change when the purge system pressure approaches a predetermined first reference pressure. The diagnosis means measures a second rate of pressure change when the purge system pressure approaches a predetermined second reference pressure. The second reference pressure differs from the first reference pressure, and the second reference pressure value is closer to the pressure of the purge system before the pressure of the purge system was changed by the pressure changing means than the first reference pressure. The diagnosis means judges whether the purge system has a malfunction based on the ratio of the first rate to the second rate.

This invention further provides a method for diagnosing whether a fuel vapor purge system has a malfunction. The purge system includes a fuel tank for storing fuel and supplies fuel vapor from the tank to an air-intake passage of an engine. The method includes changing the pressure in the purge system to a predetermined level, closing the purge system after the purge system pressure reaches the first pressure value, measuring a first rate of pressure change at a first reference pressure, measuring a second rate of pressure change at a predetermined second reference pressure that differs from the first reference pressure, and that is closer to the pressure of the purge system before the pressure of the purge system was changed to the predetermined level than the first reference pressure, and calculating a ratio of the first rate of pressure change to the second rate of pressure change.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Diagnosis apparatuses according to first to seventh embodiments of the present invention will now be described with reference to drawings. First, a diagnosis apparatus according to the first embodiment will be described.

Figure 1:
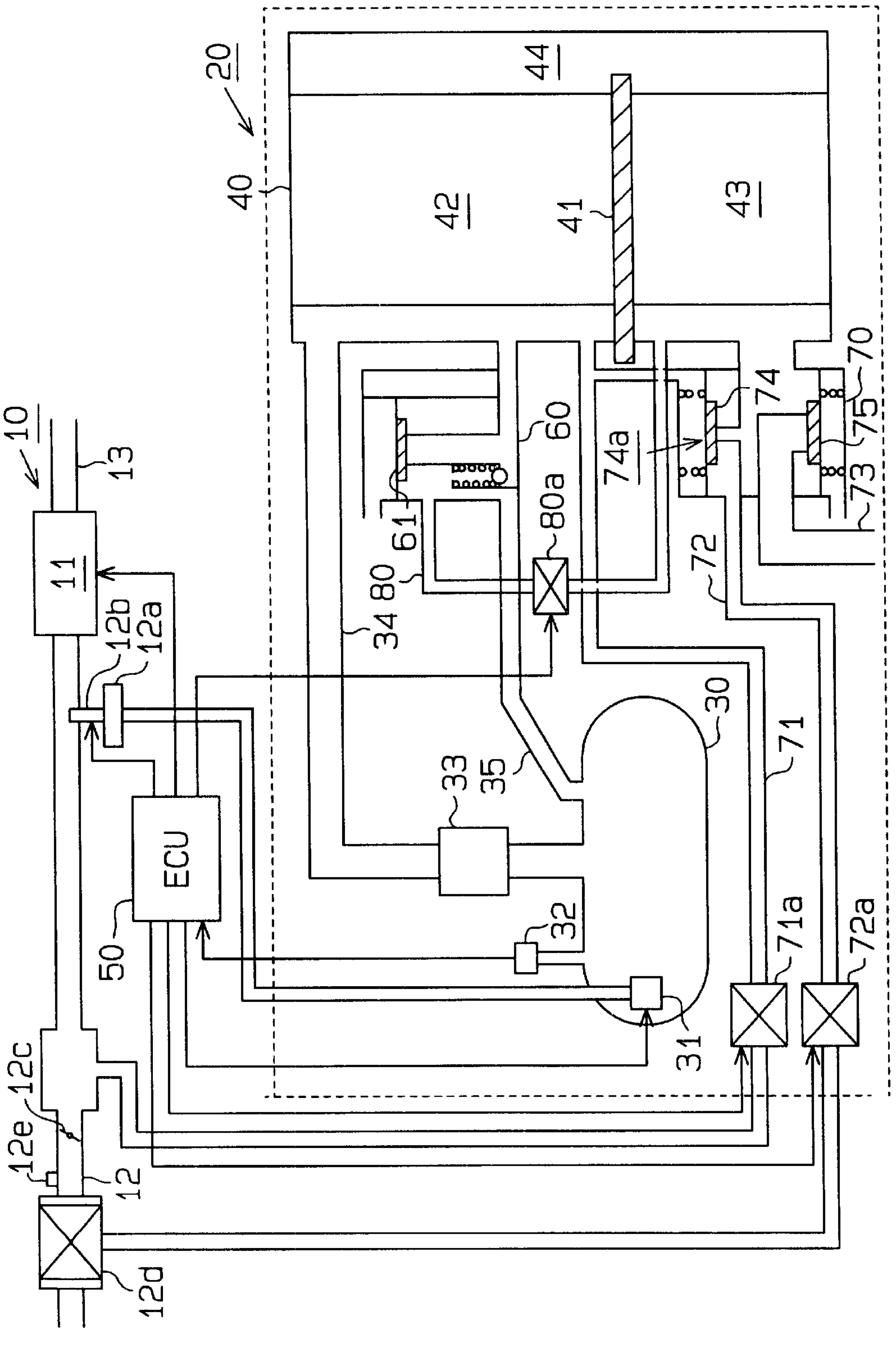
FIG. 1 is a diagram showing a diagnosis apparatus according to a first embodiment of the present invention.

As shown in FIG. 1, a vehicle engine 10 includes a combustion chamber 11, an intake passage 12 and an exhaust passage 13. A fuel tank 30 stores fuel. When the engine 10 is running, fuel is drawn from the tank 30 by a fuel pump 31. Fuel is then conducted to a delivery pipe 12*a* through a fuel passage. A fuel injector 12*b* injects fuel into the intake passage 12 of the engine 10. A throttle valve 12*c* is located in the intake passage 12. The throttle valve 12*c* alters the cross-sectional area of the intake passage in accordance with the position of a gas pedal (not shown). An air cleaner 12*d* and an air flowmeter 12*e* are located at the upstream side of the throttle valve 12*c*. The air cleaner 12*d* cleans atmospheric air drawn into the passage 12. The flow meter 12*e* measures the amount of intake air.

A fuel vapor purge system 20 includes a canister 40 and a purge line 71. The canister 40 collects fuel vapor from the fuel tank 30. The collected fuel vapor is supplied to the intake passage 12 via the purge line 71. A pressure sensor 32 and a breather control valve 33 are located at the top of the fuel tank 30. The pressure sensor 32 measures the pressure in a space including and connected to the interior of the fuel tank 30. A breather passage 34 is directly connected to the canister 40. The breather control valve 33 is a diaphragm type differential valve. When the pressure in the fuel tank 30 is higher than the pressure in the breather passage 34, for example, when fuel is being supplied to the fuel tank 30, the breather control valve 33 is open, which causes fuel vapor to flow to the breather passage 34. The space in the fuel tank 30 is connected to a vapor passage 35, the diameter of which is smaller than that of the breather passage 34. The vapor passage 35 is connected to the canister 40 via a tank pressure control valve 60. The tank pressure control valve 60 is also a diaphragm type differential pressure valve and has the same function as the breather control valve 33. As illustrated in FIG. 1, the tank pressure control valve 60 includes a diaphragm 61. When the pressure in the fuel tank 30 is higher than the pressure in the canister 40 by an amount equal to or greater than a predetermined value, the diaphragm 61 is displaced to open the tank pressure control valve 60. The breather control valve 33 has the same structure as the tank pressure control valve 60.

The canister 40 contains an adsorbent comprised of activated carbon, which adsorbs fuel vapor. When the absorbent is exposed to a vacuum pressure, the fuel vapor adsorbed by the adsorbent is separated from the adsorbent. The canister 40 is connected to the fuel tank 30 through the breather passage 34 and the vapor passage 35. The canister 40 is also connected to an atmosphere intake passage 72 and an outlet passage 73 via an atmosphere valve 70.

The purge line 71 is connected to the intake passage 12. An electromagnetic purge valve 71*a* is located in the purge line 71. The atmosphere intake passage 72 is connected to an air cleaner 12*d*. An electromagnetic atmosphere intake valve 72*a* is located in the passage 72.

The atmosphere valve 70 includes a first diaphragm 74 and a second diaphragm 75. A space 74*a* at the backside of the first diaphragm 74 is connected the purge line 71. Normally, the first diaphragm 74 disconnects the canister 40 from the atmosphere intake passage 72. When the pressure in the purge line 71 is equal to or lower than a predetermined vacuum pressure value, the first diaphragm 74 is displaced and allows air in the atmosphere intake passage 72 to flow into the canister 40. Normally, the second diaphragm 75 disconnects the canister 40 from the outlet passage 73. When the pressure in the canister 40 is equal to or higher than a predetermined pressure value, the second diaphragm 75 is displaced and allows air in the canister 40 to flow out through the outlet passage 73.

The interior of the canister 40 is divided in to a first chamber 42 and a second chamber 43 by a partition wall 41. A permeable filter 44 is located along a wall of the canister 40. The chambers 42 and 43 are communicated through the filter 44. The chambers 42, 43 are filled with an adsorbent comprised of activated carbon (not shown). The first chamber 42 is connected to the fuel tank 30 by two routes. A first route includes the vapor passage 35 and the tank pressure control valve 60. A second route includes the breather passage 34 and the breather control valve 33. The second chamber 43 is connected to the atmosphere intake passage 72 and the outlet passage 73 via the atmosphere valve 70. The purge line 71 connects the first chamber 42 with the downstream side of the throttle valve 12*c* in the intake passage 12. The purge valve 71*a* selectively opens the purge line 71.

Fuel vapor in the fuel tank 30 is conducted to the canister 40 through the vapor passage 35 and through the breather passage 34. The conducted fuel vapor is temporarily adsorbed by the adsorbent in the first chamber 42 and then is sent to the purge line 71. When the second diaphragm 75 in the atmospheric valve 70 is displaced to exhaust air in the canister 40 to the outlet passage 73, fuel vapor remaining in the canister 40 is adsorbed by the adsorbent in the chambers 42, 43. The fuel vapor is therefore not emitted to the atmosphere.

A vacuum passage 80 connects the interior of the tank pressure control valve 60 with the second chamber 43. An electromagnetic vacuum valve 80*a* is located in the vacuum passage 80. When the vacuum valve 80*a* is open, the interior of the tank pressure control valve 60 is connected to the second chamber 43. Particularly, if the vacuum valve 80*a* is open when the purge valve 71*a* is open and the canister 40 is exposed to vacuum pressure, the purge line 71 is connected to the fuel tank 30 via the first chamber 42, the filter 44, the second chamber 43, the vacuum passage 80, the tank pressure control valve 60 and the vapor passage 35. Since the breather passage 34 is normally connected to the first chamber 42, the breather passage 34 is also connected to the fuel tank 30 via the first chamber 42, the filter 44, the second chamber 43, the vacuum passage 80, the tank pressure control valve 60 and the vapor passage 35.

The interior of the fuel vapor purge system 20 is defined as a series of connected spaces when the canister 40 is exposed to vacuum pressure and the vacuum valve 80*a* is open. The diagnosis apparatus according to this embodiment diagnoses malfunctions in the fuel vapor purge system by judging whether air is leaking from the interior of the purge system 20.

The pressure sensor 32, the air flowmeter 12*e* and other sensors of the engine 10 and the fuel vapor purge system 20 are connected to an electronic control unit (ECU) 50. The ECU 50 receives signals from the sensors to control and diagnose the engine 10. The ECU 50 controls the fuel injector 12*b*, the fuel pump 31, the purge valve 71, the atmosphere intake valve 72*a* and the vacuum valve 80*a* and diagnoses malfunctions of the fuel vapor purge system 20.

Figure 2:
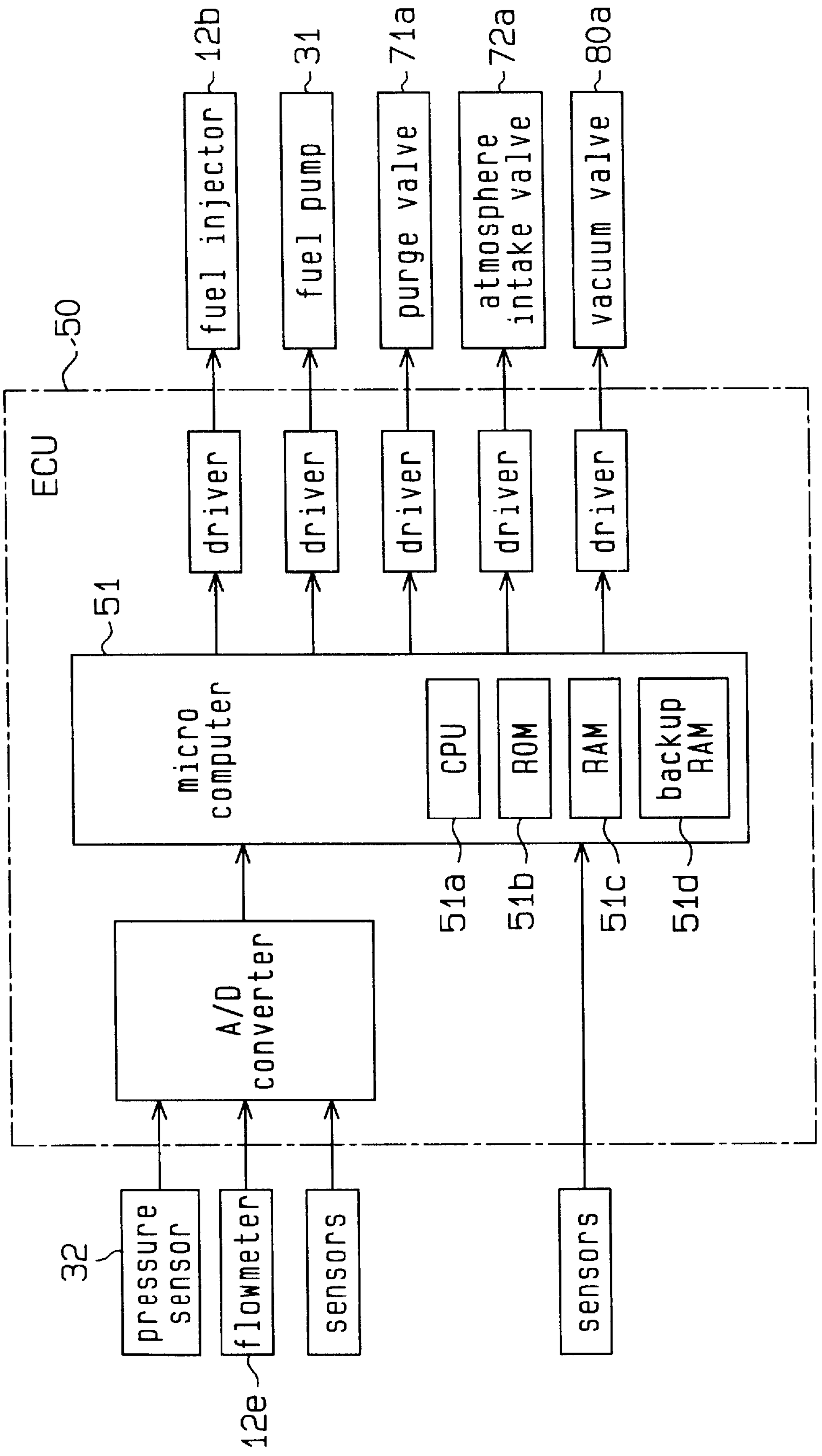
FIG. 2 is a block diagram of a controller for controlling the diagnosis apparatus of FIG. 1.

As shown in FIG. 2, the main part of the ECU 50 includes a microcomputer 51. The microcomputer 51 includes a central processing unit (CPU) 51*a*, a read only memory (ROM) 51*b*, a random access memory (RAM) 51*c* and a back up RAM 51*d*, which is non-volatile storage in this embodiment. The CPU 51*a* executes various controls for controlling and diagnosing the engine 10. Data in the backup RAM 51*d* is retained by battery power after the engine 10 is stopped.

The microcomputer 51 is connected to the pressure sensor 32, the air flowmeter 12*e* and various sensors that are used for controlling the engine 10. The various sensors include an engine speed sensor and a cylinder distinguishing sensor. Some signals from the sensors are sent to the microcomputer 51 after being processed by an A/D converter.

The output port of the microcomputer 51 is connected to drivers for driving the fuel injector 12*b*, the fuel pump 31, the purge valve 71*a*, the atmosphere intake valve 72*a* and the vacuum valve 80*a*. The ECU 50 performs various controls such as fuel injection control for controlling the engine 10 based on signals sent to the microcomputer 51 from the sensors. Further, the ECU 50 controls the purge valve 71*a*, the atmosphere intake valve 72*a* and the vacuum valve 80*a* based on signals from the pressure sensor 32, thereby diagnosing malfunctions of the fuel vapor purge system 20.

Purging performed by the fuel vapor purge system 20 will now be described.

When the pressure in the tank 30 reaches a predetermined value due to vaporization of fuel, the tank pressure control valve 60 is opened. This allows fuel vapor to flow to the canister 40 from the fuel tank 30. For example, when fuel is being supplied to the tank 30, the pressure in the fuel tank 30 is increased rapidly. At this time, the breather valve 33 is also opened. This allows a significant amount of fuel vapor to flow to the canister 40 from the fuel tank 30. Fuel vapor in the canister 40 is adsorbed by the adsorbent in the canister 40.

When the purge valve 71*a* and the atmosphere intake valve 72*a* are opened by command signals from the ECU 50, the canister 40 is exposed to the intake vacuum pressure in the intake passage 12 via the purge line 71, and fresh air is introduced into the canister 40 from the air cleaner 12*d* via the atmosphere intake passage 72. At this time, the vacuum pressure separates the fuel vapor from the adsorbent. The separated fuel vapor is purged to the intake passage 12 via the purge line 71. At the same time, air in the fuel vapor purge system 20 is replaced with fresh air from the air cleaner 12*d*.

Malfunction diagnosis for the fuel vapor purge system 20 performed by the ECU 50 will now be described.

During the malfunction diagnosis, the ECU 50 closes the atmosphere intake valve 72*a* and opens the purge valve 71*a* and the vacuum valve 80*a*. Accordingly, the interior of the canister 40 is disconnected from the atmosphere and vacuum pressure in the suction passage 12 is applied to the canister 40 via the purge line 71. Since the vacuum valve 80*a* is open, the pressure in the entire purge system, that is, the fuel tank 30, the canister 40, the breather passage 34, the vapor passage 35 and the purge line 71, becomes equal to the vacuum pressure. The pressure in the purge system 20 is monitored by the pressure sensor 32 located in the fuel tank 30.

Then, the purge valve 71*a* is closed, which seals the purge system 20. If there is no malfunction, or leakage, the pressure in the purge system is increased by vaporization of fuel in the tank 30 and finally approaches a pressure at which the air and fuel vapor in the purge system reach equilibrium. However, if there is a leak in the purge system 20, the pressure in the purge system 20 rapidly approaches atmospheric pressure. The ECU 50 diagnoses malfunctions of the purge system 20 based on changes of the pressure in the purge system 20.

Figure 3A:
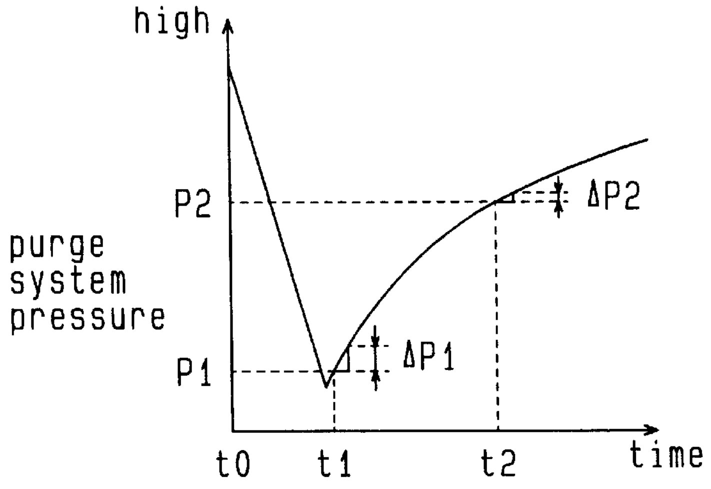
FIGS. 3(*a*) to 3(*c*) are timing charts showing changes of the pressure in a purge system.
Figure 3B:
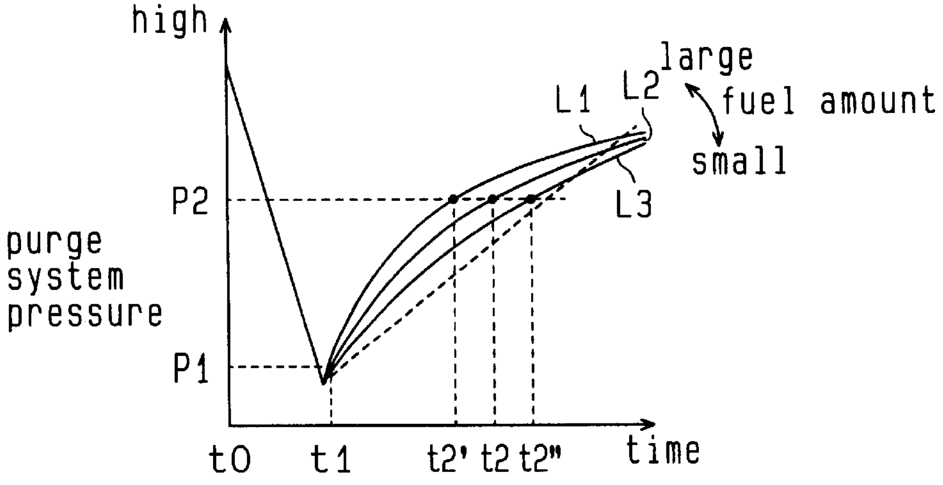
Figure 3C:
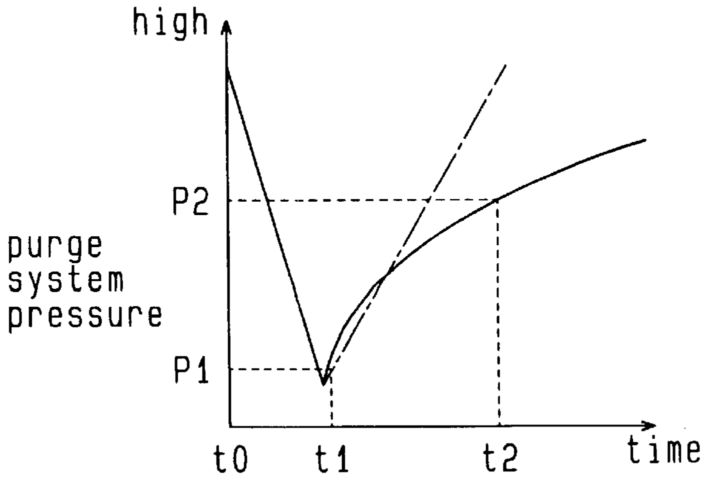

FIG. 3(*a*) shows changes of the pressure in the purge system 20. In this graph, parameters influencing the purge control, such as the intake air amount, are assumed to be constant.

When starting the malfunction diagnosis, the ECU 50 closes the atmosphere intake valve 72*a* and opens the purge valve 71*a* and the vacuum valve 80*a* at time t0. Accordingly, the pressure in the purge system 20 linearly decreases. Thereafter, when the pressure in the purge system 20 becomes lower than a predetermined reference pressure value P1, the ECU 50 closes the purge line 71 thereby sealing the purge system at a time t1. Vaporization of fuel increases the pressure in the purge system 20. If there is no puncture or crack in the purge system 20, the pressure increases until fuel vapor (vapor-phase) and the liquid fuel (liquid-phase) reach equilibrium. When the pressure in the purge system 20 reaches the first reference pressure value P1, the ECU 50 measures the first rate ΔP1 of the pressure change. The units of the pressure rate of change ΔP1 are mmHg/second or kPa/second. Other appropriate units may be used. Thereafter, the ECU 50 measures a rate of change in pressure ΔP2 (mmHg/second or kPa/second) at a time when the purge system pressure reaches a predetermined reference pressure value P2 (P1<P2<the atmospheric pressure). Then, the ECU 50 judges whether there is malfunction in the purge system by referring to a map (FIG. 4), which is described later, based on the ratio ΔP1/ΔP2 of the measured rates of pressure change ΔP1 and ΔP2 and the rate of pressure change ΔP2 at the second reference pressure value P2.

As shown in FIG. 3(*b*), the pressure increasing rate after the time t1 varies in accordance with the amount of fuel in the fuel tank 30. In FIG. 3(*b*), line L1 shows a change of pressure when a relatively great amount of fuel is in the tank 30, and line L3 shows a change of pressure when a relatively small amount of fuel is in the tank 30. The inventors have confirmed that the rate of the pressure increase decreases as the amount of fuel in the tank 30 decreases.

A solid line in FIG. 3(*c*) shows the change of pressure when there is no leakage from the purge system 20. The broken line shows the change of pressure when there is a leak.

The purge system 20 is filled with volatile fuel (liquid-phase) and air mixed with fuel vapor (vapor-phase). If there is no leakage, a sudden drop of the pressure to vacuum pressure causes the pressure in the purge system 20 to change as illustrated by the solid line in FIG. 3(*c*). That is, the pressure in the purge system 20 is increased rapidly at first. This is because the liquid fuel is vaporized such that the partial pressure of the fuel vapor reaches a certain vapor pressure. As the partial pressure of the fuel vapor and the partial pressure of air in the system 20 approach an equilibrium state, the rate of the pressure increase in the purge system 20 decreases. When the partial pressure of the fuel vapor and the partial pressure of the air in the system reach equilibrium, the pressure in the purge system 20 becomes constant. However, if there is a leak in from the purge system 20, the pressure in the purge system 20 changes as illustrated by the broken line of FIG. 3(*c*). That is, the pressure approaches atmospheric pressure, which is higher than the pressure at which the fuel vapor and the air in the system reach equilibrium. The pressure increases substantially linearly and more quickly compared to the pressure increase when there is no leakage.

At the time t1 in FIG. 3(*c*), that is, immediately after the purge system 20 is sealed, the rate of increase in the pressure of the purge system 20 when there is no leak is greater than that when there is a leak. Thereafter, the rate of increase in the pressure of the purge system when there is no leak is (solid line) gradually falls and becomes less than that when there is a leak (dotted line). This behavior has been confirmed by the inventors. The reason for the difference in the rate of pressure increase is believed to be that a sudden drop in the pressure of the purge system 20 temporarily generates high-density fuel vapor in the fuel tank 30.

After the pressure in the purge system 20 falls to the predetermined vacuum pressure, the pressure in the purge system 20 changes as illustrated in FIGS. 3(*a*) to 3(*c*). The pressure change after the time t1 has the following characteristics.

a1): The rate of increase in the pressure decreases as the vapor-phase and the liquid-phase approach equilibrium in the purge system 20. For example, a first rate of change in pressure ΔP1 when the pressure is the reference value P1 is greater than a second rate of change in pressure ΔP2 when the pressure is the reference speed P2. (see FIG. 3(*a*)).

a2): The rate of increase in the pressure is lower when there is less fuel in the fuel tank 30 and is higher when there is a greater amount of fuel in the fuel tank 30.

a3): Atmospheric air enters the purge system 20 if there is a leak in the purge system 20, which causes the pressure to increase steeply in a linear manner (see FIG. 3(*c*)). That is, the ratio of the first rate ΔP1 to the second rate ΔP2 (ΔP1/ΔP2) is approximately one.

a4): Immediately after the time t1, the rate of increase in the pressure of a leak-free purge system is greater than that of a purge system having a leak.

Thereafter, the rate of increase in the pressure of a leaking purge system surpasses that of a leak-free purge system.

Figure 4:
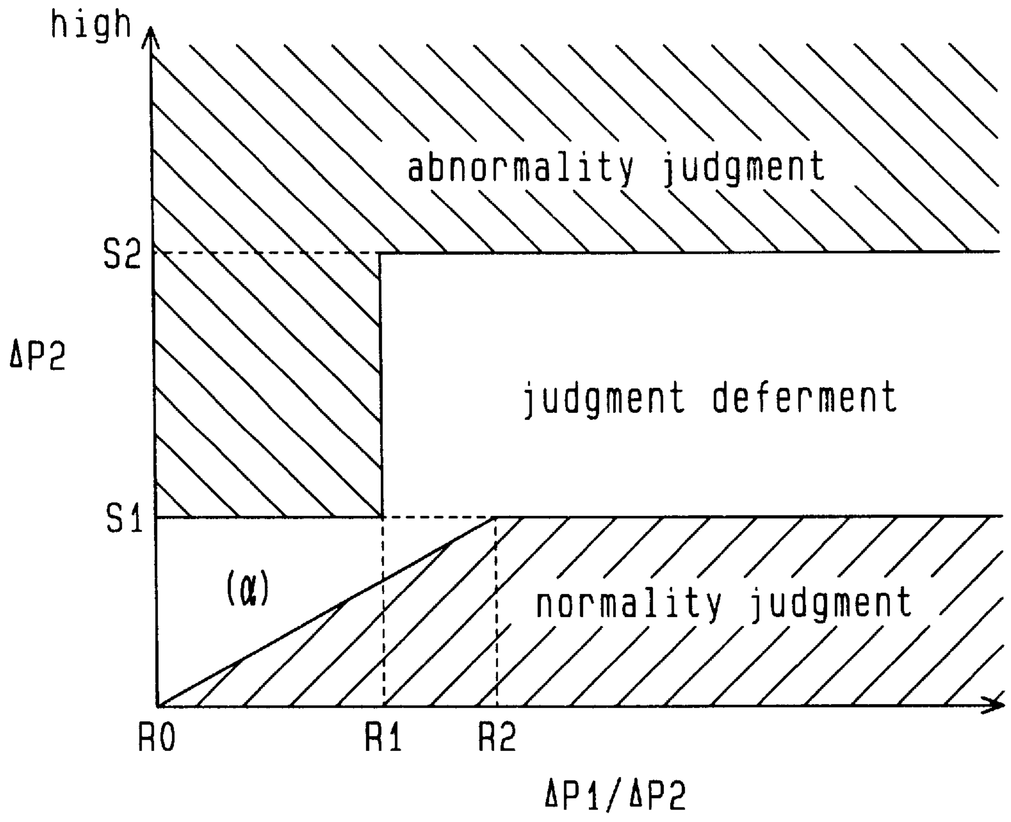
FIG. 4 is a map according to the first embodiment for diagnosing a malfunction.

Taking the characteristics a1) to a4) into consideration, the ECU 50 judges if there is a malfunction, or leakage, in the purge system 20 referring to the map of FIG. 4.

The horizontal axis of the map is the ratio of the first rate of pressure change ΔP1 to the second rate of pressure change ΔP2, and the vertical axis is the second rate of pressure change ΔP2. The criterion for finding a malfunction is determined in the following manner.

The likelihood of the existence of a leak is high for greater values of the second rate of pressure change ΔP2. Also, the likelihood that there is no leak is high for greater values of the ratio ΔP1/ΔP2. These judgments are based on the characteristics a3) and a4). Thus, taking the characteristics a4) in to consideration, the second rate of pressure change ΔP2 must be measured after the time when the rate of pressure change of a purge system having a leak surpasses that of a purge system having no leak. The second reference pressure value P2 is experimentally predetermined.

As illustrated in FIG. 4, when the second rate of pressure change ΔP2 is less than a predetermined first threshold value S1, it is very likely that there is no malfunction. When the second rate of pressure change ΔP2 is equal to or greater than the first threshold value S1 and less than the second threshold value S2, the judgment is basically deferred.

As illustrated in FIG. 4, the ECU 50 judges that there is a malfunction when the second rate of pressure change ΔP2 is equal to or greater than a predetermined second threshold value S2 regardless of the value of the ratio ΔP1/ΔP2.

Considering the characteristics a3), smaller values of the ratio ΔP1/ΔP2 (values closer to 1.0) represent a greater likelihood that the purge system 20 has a leak. Therefore, first and second reference ratios R1 and R2 of the ratio ΔP1/ΔP2 are determined such that values of the ratio ΔP1/ΔP2 smaller than second reference ratio R2 represent a high likelihood that there is a leak, and values of the ratio ΔP1/ΔP2 smaller than the first reference ratio R1 represent an even higher likelihood that there is a leak.

For example, if liquid fuel (liquid phase) and air mixed with fuel vapor (vapor phase) are in the purge system 20 when there is no leak, a sudden drop of pressure in the system 20 to the vacuum pressure first causes the pressure to increase at a constant rate due to the vapor pressure of the fuel. Thereafter, the rate of pressure increase quickly falls. When the partial pressure of the fuel vapor and the partial pressure of the air are in equilibrium, the pressure stops increasing. If the pressure in the purge system 20 continues to increase, it is very likely that there is a leak as described in FIG. 3(*c*). A ratio ΔP1/ΔP2 of 1.0 indicates that the pressure is increasing linearly without deceleration. A greater ratio ΔP1/ΔP2 indicates a drop in the rate of increase of the pressure.

In the first embodiment, the first threshold value S1 of the second rate of pressure change ΔP2 is 0.05 kPa/second. The second threshold value S2 is 0.13 kPa/second. The first reference ratio R1 of ΔP1/ΔP2 is 1.5. The second reference ratio R2 is 2.0. A region defined by the second rate of pressure change ΔP2 from the first threshold value S1 to the second threshold value S2 and the ratio ΔP1/ΔP2 greater than the first reference ratio R1 is defined as a judgment deferment region. A region defined by second rates of pressure change ΔP2 from the first threshold value S1 to the second threshold value S2 and ratios ΔP1/ΔP2 smaller than the first reference ratio R1 defines part of the abnormality judgment region. The values S1, S2, R1 and R2 vary depending on the volume of the purge system 20. Therefore, the values S1, S2, R1 and R2 are experimentally predetermined for each variation of the purge system.

In a region where the second rate of pressure change ΔP2 is lower than the threshold value S1, the system 20 is basically considered to be functioning normally. However, as described above, lower values of the ratio ΔP1/ΔP2 indicate a higher likelihood of an abnormality, and a lower values of the second rate of pressure change ΔP2 indicate a lower likelihood of abnormality. Thus, in the first embodiment, a region α defined by coordinates (R0, 0), (R0, S1) and (R2, S1) is defined to be part of the judgment deferment region.

If the difference between the rates of pressure change ΔP1–ΔP2 is used instead of the ratio ΔP1/ΔP2 for judging whether there is a leak in the purge system 20, it will be difficult to properly define the abnormality judging region, the normality judging region and the judgment deferment region. Two cases, a first pressure change and a second, different pressure change, are compared as follows. In the first case, the first rate ΔP1 is 2A and the second rate ΔP2 is A. In the second case, the first rate ΔP1 is 4A and the second rate ΔP2 is 3A. The value A is an arbitrary value. The difference (ΔP1–ΔP2) of the first case is computed by an equation (1)

$$2A-A=A \tag{1}$$

The difference (ΔP1–ΔP2) of the second case is computed by an equation (2)

$$4A-3A=A \tag{2}$$

Therefore, if the pressure speed difference (ΔP1–ΔP2) is used, the two cases cannot be distinguished.

The ratio ΔP1/ΔP2 of the first case is computed by an equation (3).

$$2A/A=2/1 \tag{3}$$

The ratio ΔP1/ΔP2 of the second case is computed by an equation (4).

$$4A/3A=4/3 \tag{4}$$

Thus, comparing the ratios of the two cases results in an obvious difference, which allows the cases to be easily distinguished. That is, for any values of the rates ΔP1 and ΔP2, the first case cannot be distinguished from the second case if the difference between the rates ΔP1 and ΔP2 in the first case is equal to that of the second case. However, comparing the ratios allows the first case to be distinguished from the second case.

Using the map of FIG. 4, the first and second cases will now be judged. In the first case, the second rate ΔP2 is between the value S1 and S2, and the ratio ΔP1/ΔP2 is 2/1 or 2.0 (≈R2). Thus, the ratio ΔP1/ΔP2 is in the judgment deferment region. In the second case, the ratio ΔP1/ΔP2 is 4/3 (≈1.3<R1). Thus, even if the second rate ΔP2 is between the value S1 and the second threshold value S2, the ratio ΔP1/ΔP2 is in the abnormality region. In this manner, the two cases of pressure change are distinguished. However, if the pressure difference (ΔP1–ΔP2) is used, the difference in the first and second cases are both A. Thus, the two cases cannot be distinguished.

In this manner, the judgment standard for judging abnormality of the system is determined.

The process of malfunction diagnosis for the purge system 20 using the map of FIG. 4 will now be described.

Figure 5:
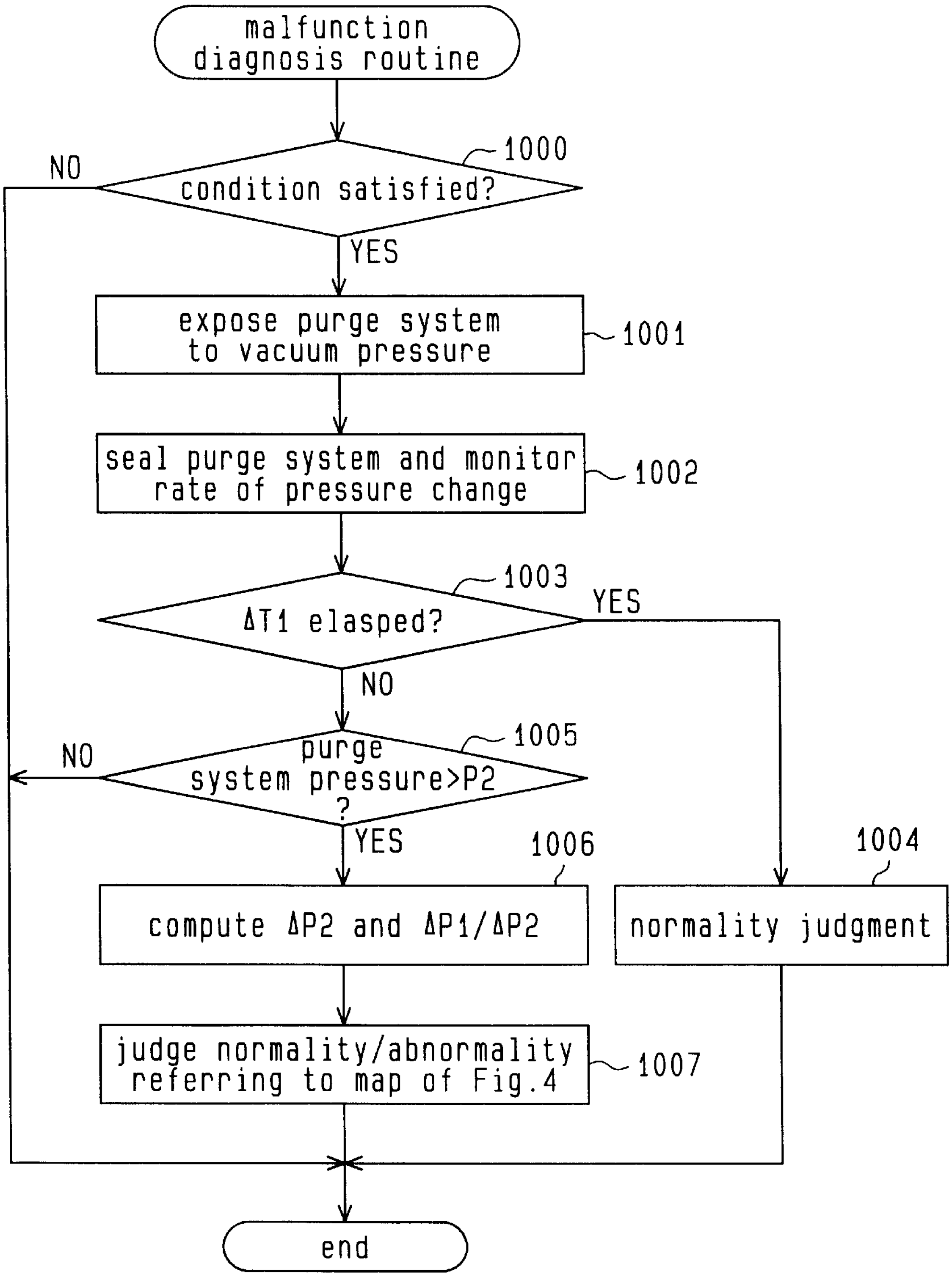
FIG. 5 is a flowchart illustrating a malfunction diagnosis routine according to the first embodiment.

FIG. 5 is a flowchart showing a malfunction diagnosis routine for detecting malfunction (leakage) of the purge system 20. The ECU 50 executes this routine at predetermined intervals.

When entering this routine, the ECU 50 judges whether the conditions for executing the diagnosis are satisfied at step 1000. Specifically, the ECU 50 judges whether the following conditions (b1) to (b3) are all satisfied.

(b1) The air fuel ratio A/F detected by an air-fuel ratio sensor (not shown) is not changing rapidly;

(b2) The vehicle speed detected by a vehicle speed sensor (not shown) is not changing rapidly; and (b3) The registration of air-fuel ratio control and purge control learning values is completed.

If the conditions (b1) to (b3) are all satisfied, the ECU 50 moves to step 1001. If any one of the conditions (b1) to (b3) is not satisfied, the ECU 50 terminates the routine.

At step 1001, the ECU 50 opens the purge valve 71*a* and the vacuum valve 80*a* and closes the atmosphere intake valve 72*a*. Accordingly, the purge system 20 is communicated with the intake passage 12. As a result, the purge system 20 is exposed to the vacuum pressure. Thereafter, the pressure in the purge system falls until the ECU 50 judges that the pressure in the system 20 is lower than the first reference pressure value P1 (P1<atmospheric pressure). Step 1001 is performed until the pressure in the system 20 becomes lower than the first reference pressure value P1 using flags.

At step 1002, the ECU 50 closes the purge valve 71*a* for sealing the purge system 20. Then, the ECU 50 continuously monitors the rate of pressure change ΔP for a predetermined period. As described above, after the purge valve 71*a* is closed, the pressure in the purge system 20 is initially lower than the first reference pressure value P1. The pressure increases due to vaporization of fuel in the fuel tank 30.

Figure 6:
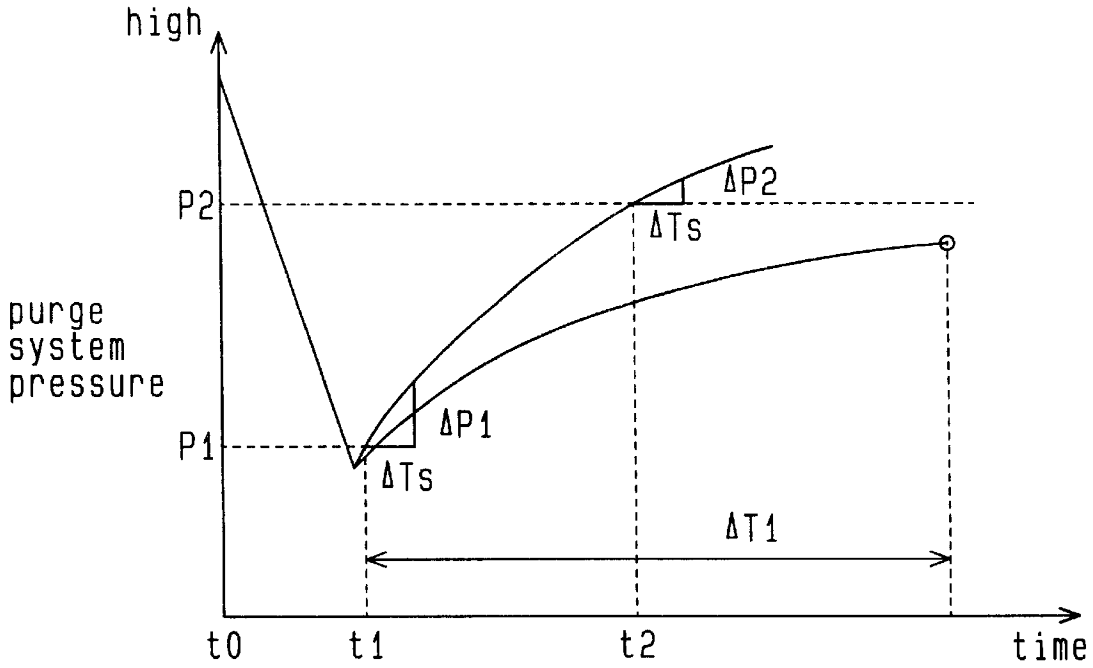
FIG. 6 is a timing chart showing a diagnosis executed by the diagnosis apparatus of the first embodiment.

At step 1003, the ECU 50 judges whether the time ΔT, in which the pressure in the purge system 20 changes from the first reference pressure value P1 to the second reference pressure value P2, is greater than a value ΔT1, which is, for example, sixty seconds. If there is no leakage in the purge system, the pressure increase in the purge system 20 is caused only by the fuel vaporization in the fuel tank 30. Thus, the time ΔT is a relatively long period like the time ΔT1 in FIG. 6. The value ΔT1 is chosen based on experiments to be long enough to determine that there is no leakage in the purge system. Therefore, if the time ΔT is longer than the value ΔT1, the ECU 50 judges that the pressure in the purge system 20 has not been increased due to atmospheric air and selects YES at step 1003. At step 1004, the ECU 50 judges that there is no malfunction in the purge system and terminates the routine. If ΔT is shorter than ΔT1, the ECU 50 selects NO at step 1003.

At step 1005, the ECU 50 judges whether the pressure in the purge system 20 has reached the second reference value P2. If the pressure reaches the second reference value P2, the ECU 50 measures the first rate pressure change ΔP1 in a predetermine time period $\Delta Ts$ (for example five seconds) immediately after the purge system pressure reaches the first reference value P1 and the second rate of pressure change $\Delta P2$ in the period $\Delta Ts$ immediately after the purge system pressure reaches the second reference value P2. Then, the ECU 50 computes the ratio $\Delta P1/\Delta P2$.

At step 1007, the ECU 50 finds the coordinates of the second rate of pressure change $\Delta P2$ and the ratio $\Delta P1/\Delta P2$ on the map of FIG. 4 to decide that there is a leak, that there is no leak, or that judgement is to be deferred.

As described previously, if the second rate of pressure change $\Delta P2$ is equal to or greater than the second threshold value S2, the ECU 50 basically judges that the there is a leak in the purge system. If the second rate $\Delta P2$ is less than the first threshold value S1, the ECU 50 judges that the purge system has no leak. If the second rate $\Delta P2$ is equal to or greater than the first threshold value S1 and less than the second threshold value S2, the ECU 50 defers the judgment. However, if the ratio $\Delta P1/\Delta P2$ is equal to or less than the first reference ratio R1, the ECU 50 judges there is a leak in the purge system. If the coordinates are in the region a when the second rate $\Delta P2$ is smaller than the first threshold value S1, the ECU 50 defers the judgment.

In the malfunction diagnosis of the first embodiment, leakage from the system 20 is detected based on the second rate of pressure change $\Delta P2$ when the pressure in the system 20 reaches the second reference pressure value P2. The rate of pressure change when the purge system reaches the second reference pressure value P2 is not measured by simply lowering the purge system pressure to the second reference pressure value P2. The ECU 50 starts measuring the rate of pressure change after the speed is steady in the entire purge system 20. Specifically, the purge system pressure is first lowered below the first reference pressure value P1, which is lower than the second reference pressure value P2. The ECU 50 then monitors changes of the purge system pressure. The ECU 50 computes the first and second rates of pressure change $\Delta P1$ and $\Delta P2$ at the first and second reference pressure values P1 and P2. Considering the ratio $\Delta P1/\Delta P2$, the ECU 50 judges whether there is a leak.

If the malfunction diagnosis is executed based only on the second rate of pressure change $\Delta P2$ when the purge system pressure approximately reaches the second reference pressure value P2, the ECU 50 may reach an erroneous judgment as described below.

Figure 7:
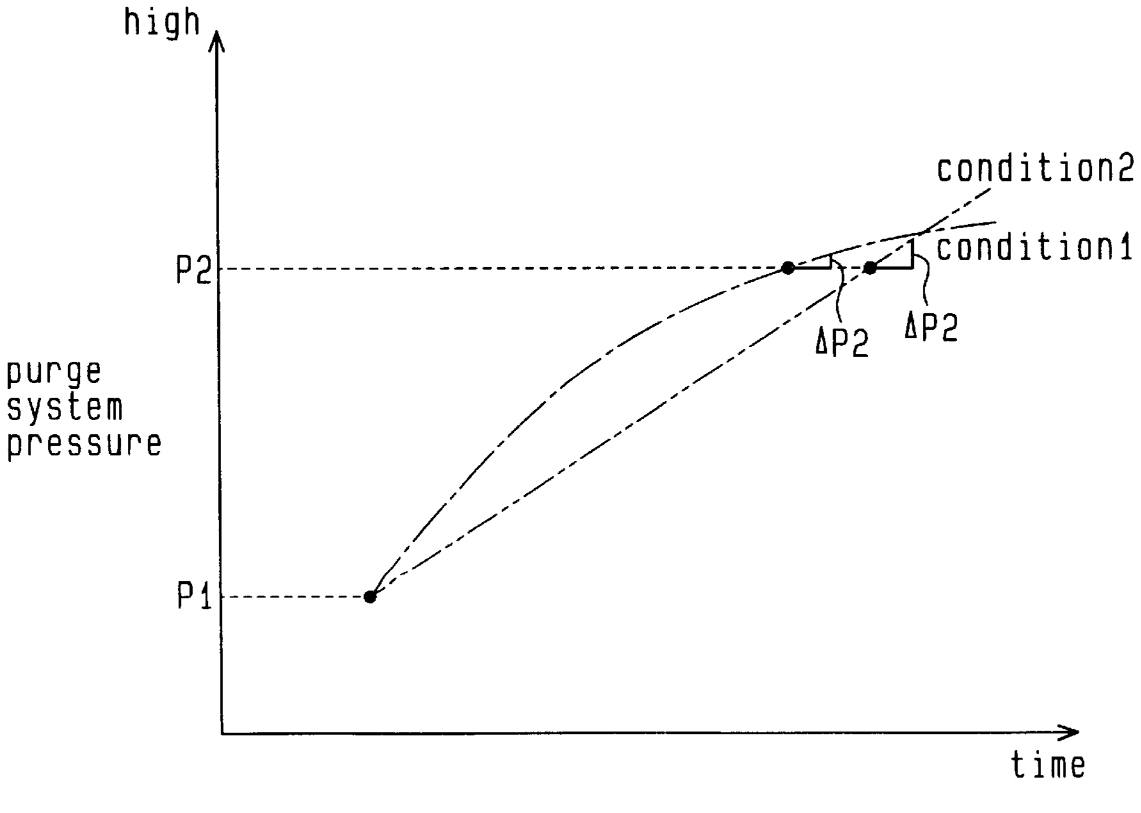
FIG. 7 is a timing chart showing the diagnosis accuracy according to the first embodiment.

For example, the first broken line condition (represented by a broken line having alternating long and short dashes) in FIG. 7 represents a case where there is no leakage in the purge system 20. In the first condition, either highly volatile fuel, a large amount of fuel, or a large amount of highly volatile fuel is in the tank 3. The broken line having paired short dashes of the second condition represents a case where there is a minute hole of approximately 0.5 mm in diameter formed in the purge system 20. In the second condition, either low volatility fuel, a small amount of fuel, or a small amount of low volatility fuel is in the tank 30.

The diagnosis apparatus of the first embodiment accurately detects leakage based on the second rate of pressure change $\Delta P2$ and the ratio $\Delta P1/\Delta P2$. The apparatus accurately detects leakage through a small hole having diameter of 0.5 mm.

If a low volatility fuel is used or if a small amount of fuel is in the tank 30, the pressure in the purge system 20 increases slowly when there is no leakage in the purge system. That is, the period $\Delta T$, which is necessary for the pressure to reach the second reference pressure value P2, is sufficiently long ($\Delta T > \Delta T1$). In this case, the ECU 50 judges that there is no malfunction in the purge system 20 even before the pressure of the purge system 20 reaches the second reference pressure value P2. Thus, if the purge system 20 is functioning normally, the judgment time is shortened.

The first embodiment has the following advantages.

(1) The ECU 50 accurately diagnoses malfunctions even if the type and the amount of fuel varies.

(2) Malfunctions are accurately diagnosed based on the rates of pressure change at the two reference pressure values P1 and P2, which are only slightly different from each other.

(3) If it is certain that there is no leakage in the purge system 20, the diagnosis time is shortened, which permits the diagnosis to be performed frequently. As a result, an accurate diagnosis result is obtained.

A diagnosis apparatus according to a second embodiment will now be described. The difference from the first embodiment will mainly be discussed below.

If the pressure in the purge system 20 changes from the first reference pressure value P1 to the second reference pressure value P2 in a sufficiently short time, the diagnosis will be quick when there is no leakage. However, if there is no leakage and the amount of fuel vapor in the tank 30 is small, the pressure increases very slowly after the purge system 20 is exposed to the vacuum pressure. If the rate of pressure increase is slow, it is possible to judge that the purge system 20 has a malfunction before the time $\Delta T1$, which is used in the first embodiment, has passed.

Figure 8:
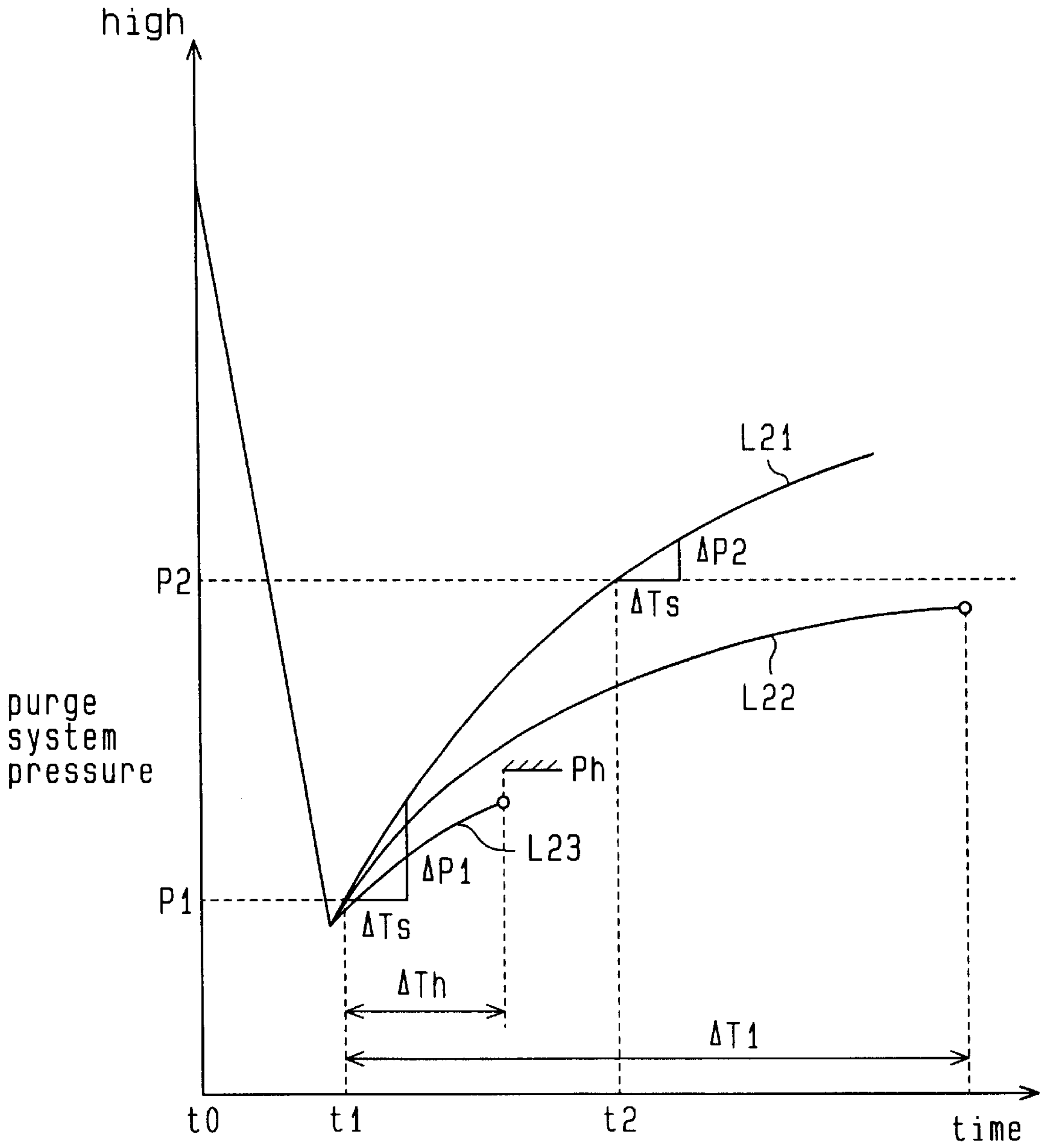
FIG. 8 is a timing chart showing a diagnosis executed by a diagnosis apparatus according to a second embodiment of the present invention.

FIG. 8 shows such a case. Even if the purge system 20 is functioning normally, the rate of the pressure change after the vacuum pressure is applied changes in accordance with the nature of the fuel and the amount of fuel in the tank 30. Line L21 in FIG. 8 illustrates a case where there is a relatively a large amount of fuel vapor in the tank 30, that is, where the fuel is highly volatile or a great amount of fuel is in the tank 30. Line L22 illustrates a case where there is a relatively small amount of fuel vapor in the tank 30, that is, where the fuel is not particularly volatile or where there is not much fuel in the tank 30. Line L23 illustrates a case where there is even less fuel vapor in the tank 30.

(A) As described in the first embodiment, if the pressure changes along line L21, the state of the purge system 20 is judged based on whether the coordinates of the ratio $\Delta P1/\Delta P2$ and the second rate of pressure change $\Delta P2$ is in the normal region in the map of FIG. 4.

(B) If the pressure changes along line L22, the time $\Delta T1$ elapses before the pressure reaches the second reference pressure value P2. Thus, the pressure change is judged to be normal.

(C) Line 23 illustrates a case where pressure change is small. Specifically, line 23 shows a case where the pressure in the purge system 20 is lower than a third reference pressure value Ph after a predetermined period $\Delta Th$ elapses from the time t1. The third reference pressure value Ph is closer to the first reference pressure value P1 than to the second reference pressure value P2. In this case, the pressure change is judged to be normal before the predetermined time $\Delta T1$ has passed. Further, the time $\Delta Th$ can be shortened in accordance with the third reference pressure value Ph, which results in a quicker judgment when there is no leakage in the purge system 20.

Figure 9:
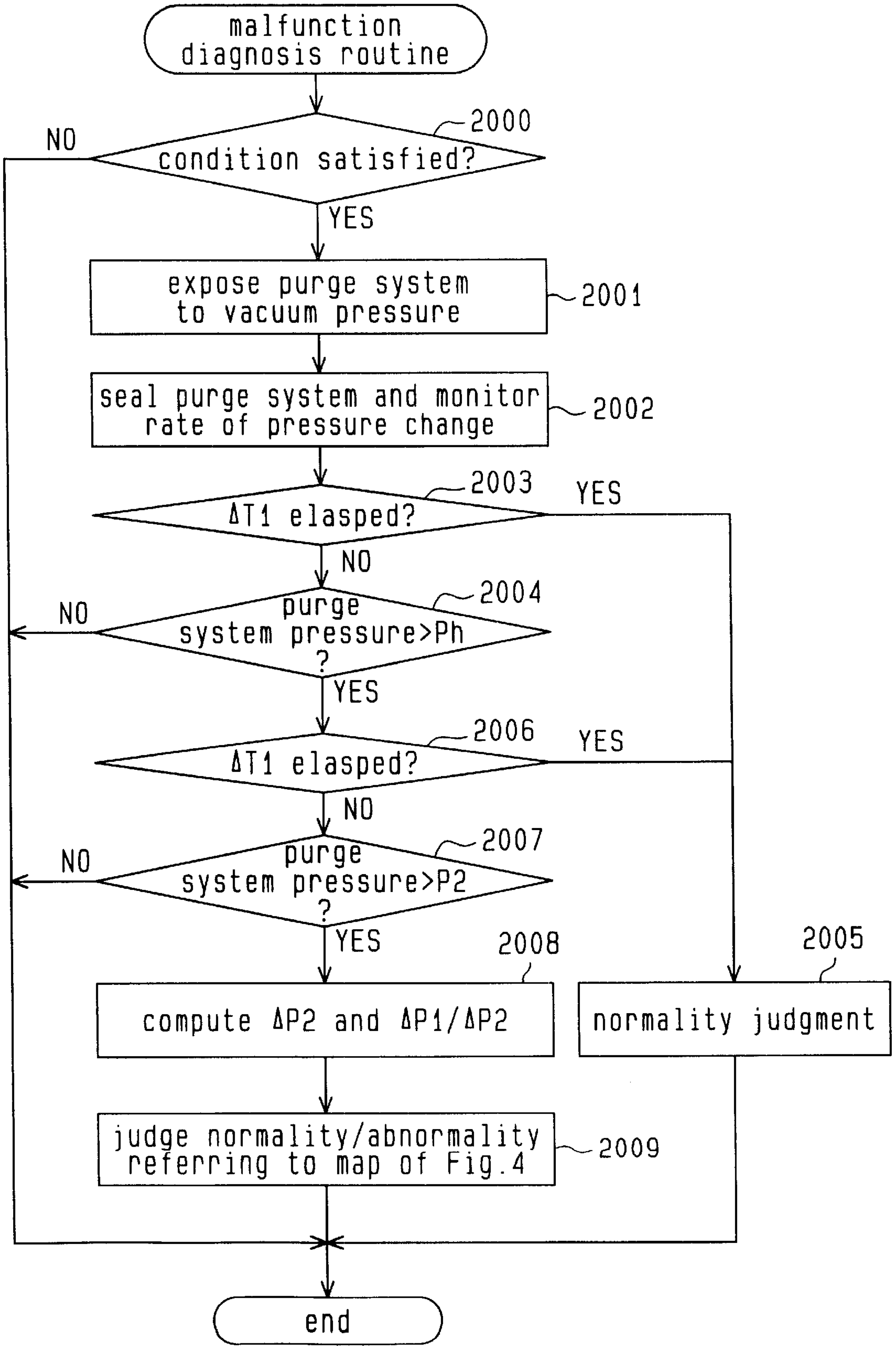
FIG. 9 is a flowchart showing a diagnosis routine according to the second embodiment.

FIG. 9 is a flowchart showing a malfunction diagnosis according to the second embodiment. The ECU 50 executes this routine at predetermined intervals.

When entering this routine, the ECU 50 judges whether the conditions for executing the malfunction diagnosis are satisfied. If the conditions are satisfied, the ECU 50 moves to step 2001. If the conditions are not satisfied, the ECU 50 temporarily suspends the routine. At step 2001, the ECU 50 opens the purge valve 71*a* and closes the atmosphere intake valve 72*a*. This causes the pressure in the purge system to be lowered by the vacuum pressure from the intake passage 12. Step 2001 is executed by using flags until the purge system pressure falls below the first reference pressure value P1.

At step 2002, the ECU 50 closes the purge valve 71*a* to seal the purge system 20. The ECU 50 monitors the rate of pressure change ΔP for a predetermined period.

At step 2003, the ECU 50 judges whether the time ΔTh (for example, fifteen seconds) shown in FIG. 8 has elapsed from when the pressure in the purge system is lowered below the first reference pressure value P1.

If the time ΔTh has elapsed, the ECU 50 judges whether the pressure in the purge system 20 is below than the third reference pressure value Ph at step 2004. If the pressure is judged to be lower than the third reference pressure value Ph, the ECU 50 moves to step 2005. At step 2005, the ECU 50 judges that the there is no malfunction in the purge system 20 and terminates the routine.

If the pressure has not reached the third reference pressure value Ph when the predetermined time ΔTh has elapsed from when the pressure is lowered to the first reference pressure value P1, the change of the pressure is judged to be normal. In other words, the purge system 20 is judged to be normally functioning as described in FIG. 8. The time ΔTh is extremely short compared to the time ΔT1, which allows the judgment to be made earlier if there is no leakage in the purge system 20.

If the pressure in the purge system 20 is judged to be equal to or higher than the third reference pressure value Ph when the period ΔTh has elapsed at step 2004, the ECU 50 executes steps 2006 to 2009.

Steps 2006 to 2009 are the same as steps 1003 and 1007. That is, the ECU 50 judges that the determination of step 2006 is positive if the period ΔT, during which the pressure in the purge system 20 increases from the first reference pressure value P1 to the second reference pressure value P2, is longer than the predetermined time ΔT1 (for example sixty seconds). At step 2005, the ECU 50 judges that there is no leakage in the purge system 20 and terminates the routine.

If the pressure in the purge system 20 reaches the second reference pressure value P2 within the predetermined time ΔT1, the ECU 50 judges whether there is a malfunction in the purge system 20 referring to the map of FIG. 4 based on the ratio ΔP1/ΔP2 and the second rate ΔP2, which is the rate of pressure change when the purge system pressure reaches the second reference pressure value P2.

Since the coordinates of the second rate of pressure change ΔP2 and the ratio ΔP1/ΔP2 are used in the diagnosis, small punctures having a diameter of 0.5 mm are accurately detected regardless of the nature and the amount of fuel in the tank 30.

In addition to the advantages (1) to (3) of the first embodiment, the second embodiment has the following advantages.

(4) When it is certain that there is no leakage in the purge system 20, the diagnosis is completed in the period ΔTh, which is shorter than the period ΔT1.

(5) Since the diagnosis judging that there is no leakage in the purge system 20 is executed in a short time, an erroneous detection due to external factors when computing the second rate of pressure change ΔP2 is prevented.

(6) A fuel vapor purge system having the diagnosis apparatus described above cannot purge fuel vapor to the intake passage 12 during a diagnosis. Therefore, if the malfunction diagnosis is frequently executed, the amount of purged fuel vapor is small. However, in the purge system of the second embodiment, the diagnosis time is shortened to the period ΔTh when there is no malfunction, which guarantees a sufficient amount of purged fuel vapor.

A diagnosis apparatus according to a third embodiment will now be described. The difference from the first and second embodiments will mainly be discussed below.

Turning, speed changes of the vehicle, and bumps on the road surface cause the fuel in the fuel tank 30 to rise, fall and splash. This motion of fuel fluctuates the pressure in the purge system 20, which disturbs the diagnosis.

As in the first and second embodiments, the pressure and rate of pressure change in the purge system 20 are measured when the purge system is sealed. At this time, the pressure fluctuation level is also measured. The pressure fluctuation level refers to a value ΔΔP, which is computed by applying second order differentiation to a change of the purge system pressure in an extremely short period. The value ΔΔP represents the fluctuation of the fuel vapor pressure.

Figure 10A:
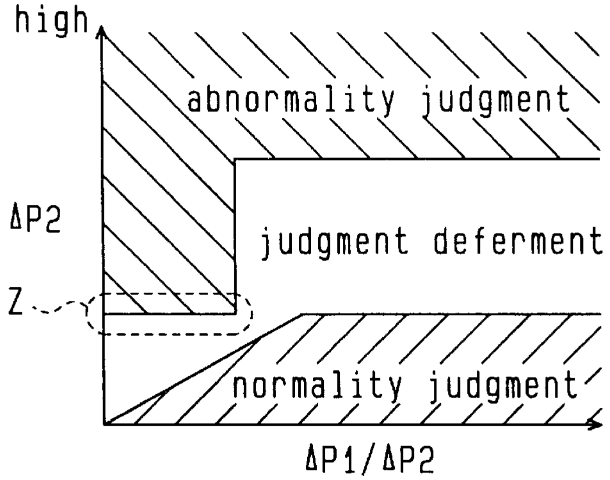
FIGS. 10(*a*) to 10(*c*) are maps used by a diagnosis apparatus according to a third embodiment of the present invention.
Figure 10B:
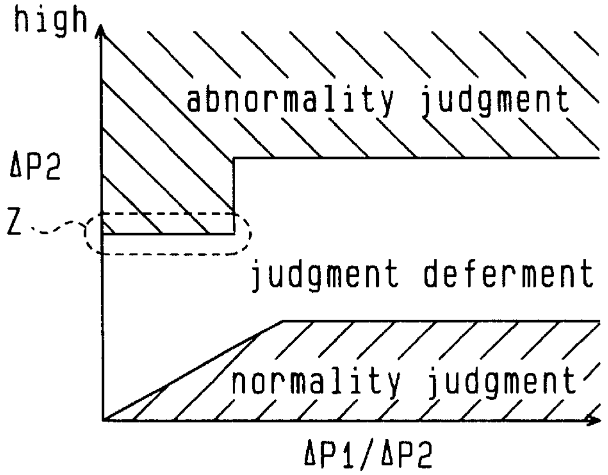
Figure 10C:
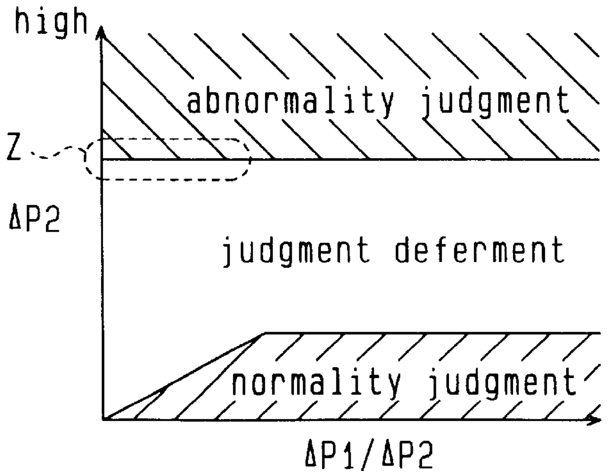

In the third embodiment, for example, three maps shown in FIGS. 10(*a*) to 10(*c*) are prepared in accordance with the pressure fluctuation level. The maps are selectively used in the malfunction diagnosis of the purge system 20 in accordance with the pressure fluctuation level.

The map of FIG. 10(*a*) is used when the pressure fluctuation level is lowest, for example, when the engine is idling. The map of FIG. 10(*c*) is used when the pressure fluctuation level is the highest for permitting diagnosis to be continued. The map of FIG. 10(*b*) is used when the pressure fluctuation level is about midway between the maps of FIGS. 10(*a*) and 10(*c*).

The maps of FIGS. 10(*a*) to 10(*c*) are based on the same concept as the map of FIG. 4. However, the detection deferment region is small in the map of FIG. 10(*a*), which is designed for smaller pressure fluctuation levels. The detection deferment region is large in the map of FIG. 10(*c*), which is designed for greater pressure fluctuation levels.

Selectively using the multiple maps permits an appropriate diagnosis to be performed. The pressure fluctuation level is greatly increased when the vehicle is turned, accelerated, decelerated or when the driver changes the lane. Also, bumps on the road surface increase the pressure fluctuation level. If the fluctuation level is greatly increased, that is, when external factors increase a possibility of an erroneous judgment, the diagnosis is deferred in most of the cases as shown in the graph of FIG. 10(*c*). The normality judgment or the abnormality judgment is made only when it is certain. On the other hand, when the pressure fluctuation level is small, for example, when the engine is idling, the normality and abnormality judgments are more frequent.

Figure 11:
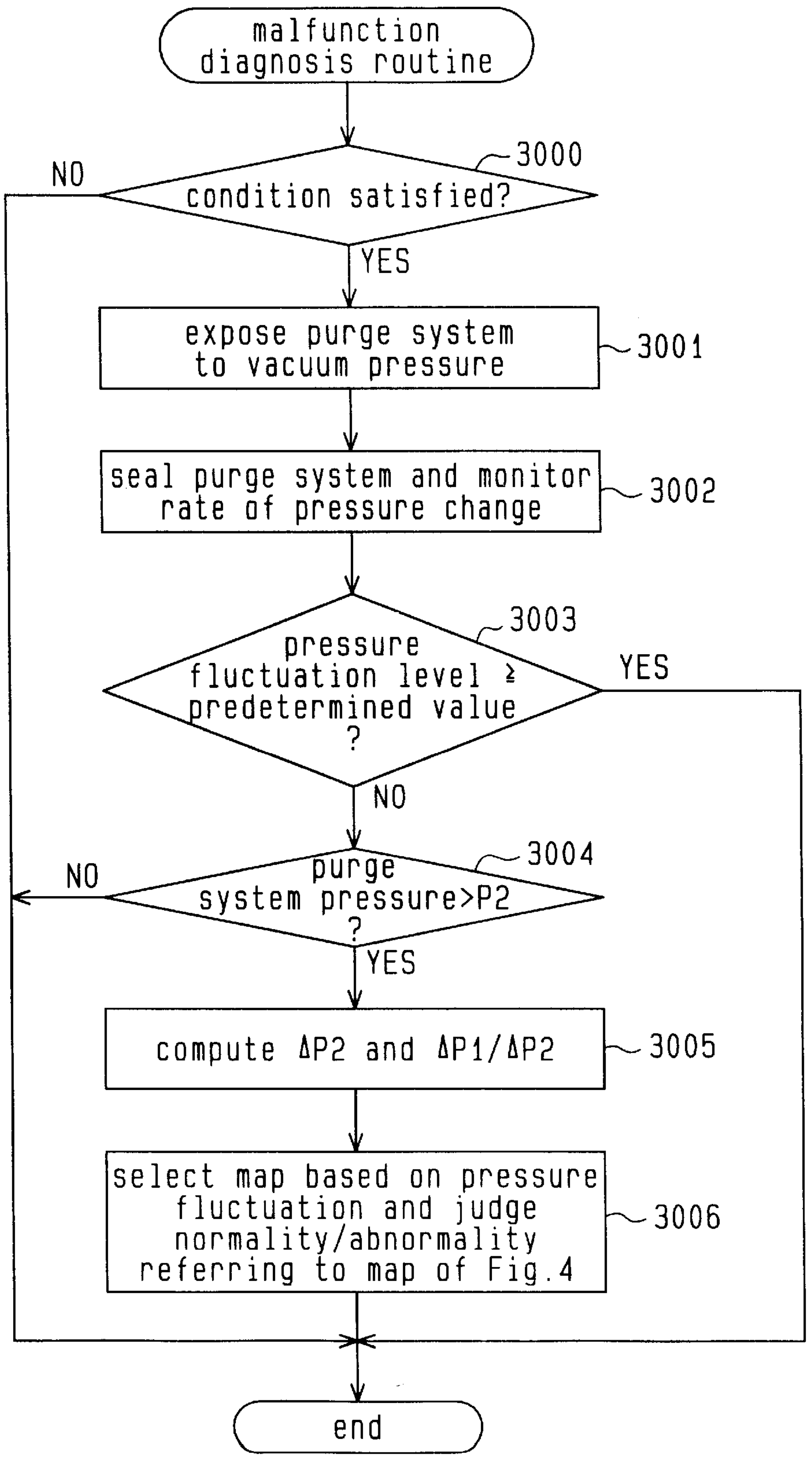
FIG. 11 is a flowchart showing a diagnosis routine according to the third embodiment.
Figure 12:
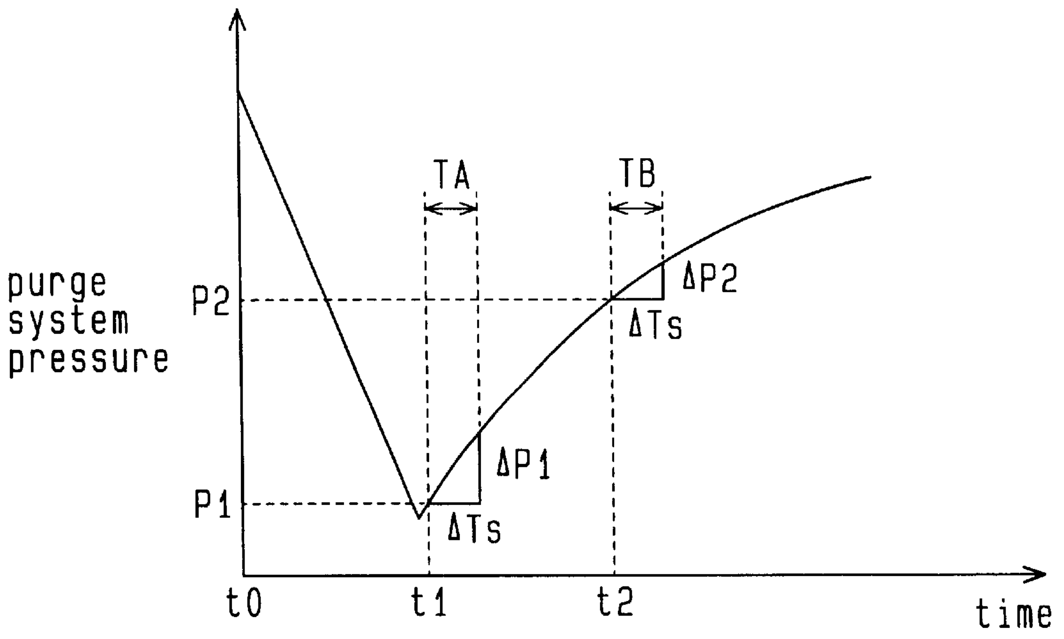
FIG. 12 is a timing chart showing changes of the pressure in a purge system according to a fourth embodiment of the present invention.

FIG. 11 shows a malfunction diagnosis routine according to the third embodiment. The ECU 50 executes this routine at predetermined intervals.

When entering this routine, the ECU 50 judges whether the conditions for executing the diagnosis are satisfied. If the conditions are satisfied, the ECU 50 moves to step 3001. If any of the conditions are not satisfied, the ECU 50 temporarily suspends the routine. At step 3001, the ECU 50 opens the purge valve 71*a* and closes the atmosphere intake valve 72*a*. Accordingly, the pressure in the purge system 20 is lowered to the predetermined pressure value P1 by the vacuum pressure of the intake passage 12. As in the above embodiments, step 3001 is executed using a flag from when the diagnosis is started until the pressure in the purge system is judged to reach the first reference pressure value P1.

At step 3002, the ECU 50 closes the purge valve 71*a* thereby sealing the purge system 20. The ECU 50 measures the rate of pressure change ΔP and the pressure fluctuation at predetermined time intervals until the pressure in the purge system reaches the predetermined pressure value P2 (P1<P2<atmospheric pressure). The rate of pressure change ΔP is measured in the same manner as in step 1002 of the first embodiment. Step 3002 is different from step 1002 in that the pressure fluctuation is also measured.

At step 3003, the ECU 50 judges whether the detected pressure fluctuation is equal to or greater than a predetermined level. If the fluctuation is equal to or greater than the predetermined level, the ECU 50 temporarily suspends the routine. If the fluctuation is smaller than the predetermined level, the ECU 50 moves to step 3004.

Steps 3004 and 3005 are the same as steps 1005 and 1006 in the routine of the first embodiment. At step 3006, the ECU 50 selects one of the maps of FIGS. 10(*a*) to 10(*c*) based on the pressure fluctuation level. The ECU 50 then judges whether there is an abnormality in the purge system using the selected map based on the second rate of pressure change ΔP2 and the ratio ΔP1/ΔP2 of the rates of pressure change. Thus, even if the pressure in the purge system fluctuates due to turning, acceleration and deceleration of the vehicle or due to bumps on the road surface, the diagnosis standard is changed in accordance with the pressure fluctuation level. Accordingly, the detection is maintained accurate.

In addition to the advantages (1) and (2) of the first and second embodiment, the third embodiment has the following advantages.

(7) The abnormality detection is executed in accordance with the pressure fluctuation level in the purge system 20, which improves the accuracy of the detection.

(8) Turning, acceleration and deceleration of the vehicle and bumps on the road surface fluctuate the pressure in the purge system 20. The diagnosis of the third embodiment flexibly deals with the pressure fluctuations, which allows frequent, accurate detection.

(9) If an external disturbance prevents accurate detection, the detection deferment region is enlarged. If there is not much external disturbance that may lead to an erroneous judgment, the detection deferment region is narrowed. Accordingly, erroneous judgment is avoided.

(10) When the pressure fluctuation in the purge system 20 is greater than a predetermined value, the detection is suspended, which prevents an erroneous detection.

In the third embodiment, one of the maps of FIGS. 10(*a*) to 10(*c*) is selected in accordance with the level of the pressure fluctuation. However, it is not necessary to prepare a plurality of maps for compensating pressure fluctuations. For example, a single map may be used and the boundary between the detection deferment region and the abnormality region, which is indicated by reference character Z, may be changed. In this case, the diagnosis has the same advantages as the third embodiment.

A diagnosis apparatus according to a fourth embodiment will now be described. The difference from the third embodiment will mainly be discussed.

In the third embodiment, the pressure fluctuation is measured during the entire period in which the rate of pressure change is measured. The detection standard is then altered according to the measured pressure fluctuation. However, in reality, it is sufficient that the detection standard be altered in accordance with the pressure fluctuation measured when the rates of pressure change ΔP1 and ΔP2 are being computed.

In the fourth embodiment, the pressure fluctuation is measured in a period TA, at which the rate of pressure change ΔP1 is computed, and in a period TB, at which the second rate of pressure change ΔP2 is computed. If the pressure fluctuations measured in the periods TA and TB are in a range to permit the diagnosis to be continued, the boundary between the abnormality judgment region and the judgment deferment region is changed in accordance with the accumulated pressure fluctuation, or fluctuation amount ΣΔΔP, in the period TB as shown in a map of FIG. 13.

The pressure fluctuation level is the value ΔΔP, which is computed by applying second order differentiation to a change of the pressure detected by the pressure sensor 32. The value ΔΔP is a parameter representing the vapor pressure fluctuation in the purge system 20 due to turning, acceleration, deceleration and motion of the vehicle. The fluctuation amount ΣΔΔP is computed by accumulating the value ΔΔP.

Figure 13:
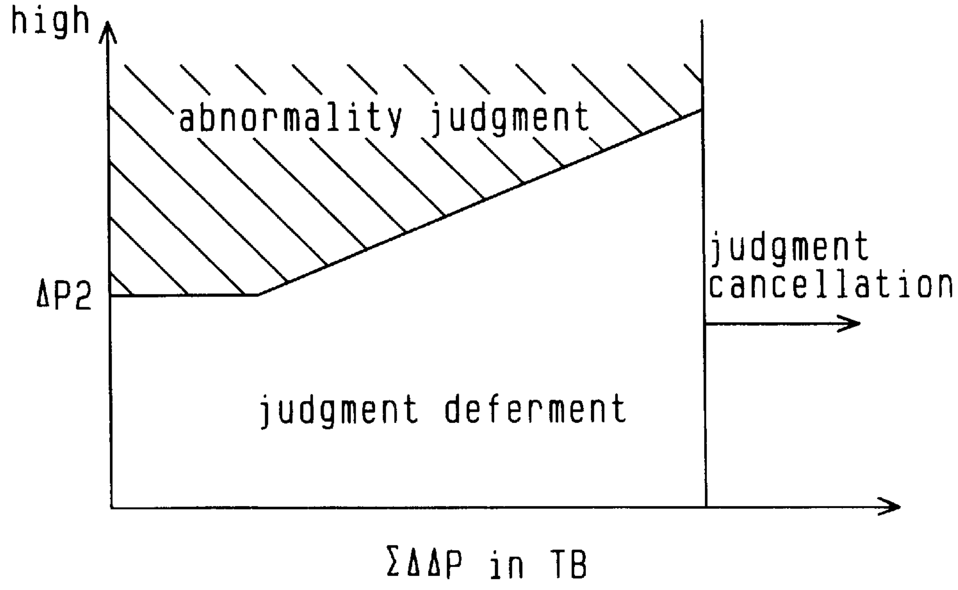
FIG. 13 is a compensation map used in the diagnosis according to the fourth embodiment.

A map of FIG. 13 shows how the boundary between the judgment deferment region and the abnormality region in the map of FIG. 4 changes between the values R0 and R1 of the ratio ΔP1/ΔP2 in accordance with the fluctuation amount ΣΔΔP. That is, the map of FIG. 13 shows that the boundary Z shown in maps of FIGS. 10(*a*) to 10(*c*) is continuously changed in accordance with the fluctuation amount ΣΔΔP.

Figure 14:
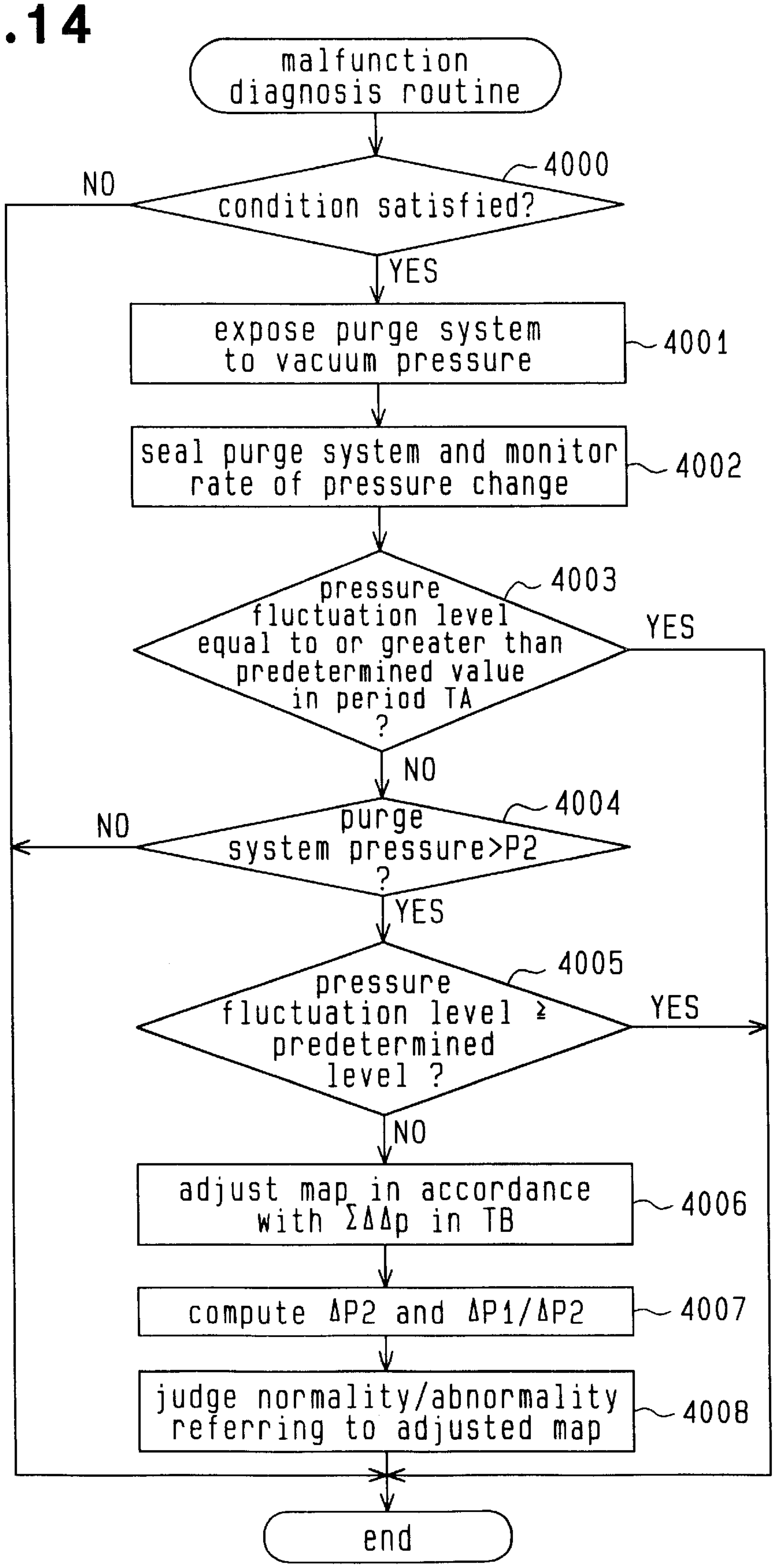
FIG. 14 is a flowchart showing a malfunction diagnosis routine according to the fourth embodiment.

FIG. 14 is a flowchart of a malfunction diagnosis routine of the fourth embodiment. As in the first and second embodiment, the ECU 50 executes the routine at predetermined intervals.

When entering this routing, the ECU 50 judges whether conditions for executing the malfunction diagnosis satisfied at step 4000. If the conditions are satisfied, the ECU 50 opens the purge valve 71*a* and closes the atmosphere intake valve 72*a*, thereby lowering the pressure in the purge system to a predetermined value P1 at step 4001. Step 4001 is performed until the system interior pressure reaches the first reference pressure value P1 by using a flag.

At step 4002, the ECU 50 closes the purge valve 71*a* to seal the purge system. At the same time, the ECU 50 continuously measures the rate of pressure change ΔP and the pressure fluctuation during a period in which the pressure in the purge system increases from the first reference pressure value P1 to the second reference pressure value P2 (P1<P2<atmospheric pressure).

At step 4003, the ECU 50 judges whether the pressure fluctuation in the period TA for computing the rate of pressure change ΔP1 when the pressure in the purge system reaches the first reference pressure value P1. If the pressure fluctuation is greater than a predetermined level, the ECU 50 temporarily suspends the diagnosis.

If the pressure fluctuation is smaller than the predetermined level in the period TA, the ECU 50 continues the diagnosis. At step 4004, the ECU 50 judges whether the pressure in the purge system 20 has reached the second reference pressure value P2. If the pressure has reached the second reference pressure value P2, the ECU 50 measures the pressure fluctuation level in a period TB for judging the pressure fluctuation level is equal to or greater than a predetermined level. If the pressure fluctuation level is equal to or greater than the predetermined level, the ECU 50 stops the diagnosis as in step 4003.

At step 4005, if the pressure fluctuation amount ΣΔΔP is in the judgment cancellation region shown in FIG. 13, the current diagnosis is stopped. The diagnosis is stopped in the same manner if the determination of step 4003 is negative.

If the pressure fluctuation level in the period TB is in the predetermined range at step 4005, the ECU 50 moves to step

4006. At step 4006, the ECU 50 adjusts the map of FIG. 4 in accordance with the pressure fluctuation amount ΣΔΔP in the period TB. That is, the boundary between the abnormality judgment region and the judgment deferment region is changed as illustrated in the map of FIG. 13 in accordance with the pressure fluctuation amount ΣΔΔP.

After adjusting the map of FIG. 4, the ECU 50 moves to step 4007. At step 4007, the ECU 50 measures the rates of pressure change ΔP1 and ΔP2 and computes the ratio ΔP1/ΔP2. At step 4008, the ECU 50 judges whether there is an abnormality in the purge system using the adjusted map of FIG. 4 referring to the second rate of pressure change ΔP2 and the ratio ΔP1/ΔP2.

As described above, the apparatus of the fourth embodiment has the following advantages in addition to the advantages (1), (2) of the first and second embodiments and the advantages (7) to (10) of the third embodiment.

(11) In the diagnosis of the fourth embodiment, the pressure fluctuation level in the purge system 20 is not continuously measured in the entire diagnosis period. However, the pressure fluctuation level is measured in the periods TA and TB, during which the rate of pressure change is measured. The diagnosis standard is altered in accordance with the accumulated pressure fluctuation value in the period TB, or the fluctuation amount ΣΔΔP. Thus, the calculation load for monitoring the pressure fluctuation in the purge system is decreased. The diagnosis standard is changed with the decreased calculation load, which improves the accuracy of the diagnosis.

(12) If the pressure fluctuation level in the purge system 20 is out of the predetermined range, the diagnosis is cancelled. However, the diagnosis is not cancelled due to the pressure fluctuation level in periods other than the periods TA and TB. Accordingly, the diagnosis is executed more frequently, which improves the diagnosis accuracy.

In the fourth embodiment, the period TB is the period ΔTs, in which the second rate of pressure change ΔP2 is measured. However, the period TB does not need to match the period ΔTs. For example, the pressure fluctuation level ΔΔP before computing the second rate of pressure change ΔP2 may be stored in the RAM 51*c* and considered for improving the accuracy and the reliability of the map adjustment.

A diagnosis apparatus according to a fifth embodiment will now be described. The difference from the first to fourth embodiment will mainly be discussed.

Normally, the pressure sensor 32 is a sensor that detects pressure in relation to the atmospheric pressure. The atmospheric pressure varies in accordance with the altitude. When the vehicle moves uphill or downhill, the atmospheric pressure changes, which changes the pressure in the purge system 20. For example, as the vehicle goes uphill, the pressure in the purge system rises more quickly. Solid line U1 in a map of FIG. 15(*a*) shows a pressure change when there is no abnormality in the purge system while the vehicle is moving on a level ground. Even if there is no abnormality in the purge system, the pressure in the purge system 20 changes along broken line U2 of FIG. 15(*a*) if the vehicle is moving uphill, which may cause the ECU 50 to erroneously detect a leak. However, if there is actually a leak in the purge system, the difference between line U1 and U2 does not cause a problem.

When the vehicle goes downhill, the pressure in the purge system rises relatively slowly. In a chart of FIG. 15(*b*), solid line D1 shows a pressure change when there is abnormality in the purge system 20 when the vehicle is moving on a level ground. Even if there is abnormality in the purge system, the pressure in the purge system 20 changes along broken line D2 in FIG. 15(*b*) when the vehicle is moving downhill, which may cause the ECU 50 to erroneously detect that there is no abnormality. However, if there is actually no abnormality in the purge system, the shift of the pressure change from line D1 to line D2 causes little problem.

When the vehicle speed is constant, the amount of intake air is increased if the vehicle starts going uphill due to the increased load on the engine. When the vehicle speed is constant, the amount of intake air is decreased if the vehicle is going downhill due to the decreased load on the engine. That is, if the vehicle speed is substantially constant, whether the vehicle is going uphill or downhill can be detected by monitoring the amount of intake air.

In the apparatus of the fifth embodiment, the intake air amount is detected in three different periods TO, TA and TB by the air flowmeter 12*e*. In the first period TO, the conditions for executing the diagnosis are confirmed when a vehicle speed is constant. In the second period TA, the rate of pressure change ΔP1 at the first reference pressure value P1 is computed after the purge system 20 is exposed to the vacuum pressure. In the third period TB, the second rate of pressure change ΔP2 at the second reference pressure value P2 is computed.

Further, the ECU 50 monitors at least the changing amount $(Q_o-Q_B)$ between the intake amount $Q_o$ in the period TO and the intake amount $Q_B$ in the period TB. If the changing amount $(Q_o-Q_B)$ is greater than a predetermined threshold value, the ECU 50 judges that the running state of the vehicle has greatly changed between the period TO and the period TB and reperforms the judgment. The intake amount $Q_o$ and the intake amount $Q_B$ are the amount of air drawn into the intake passage per unit time (for example, five seconds).

Figure 17:
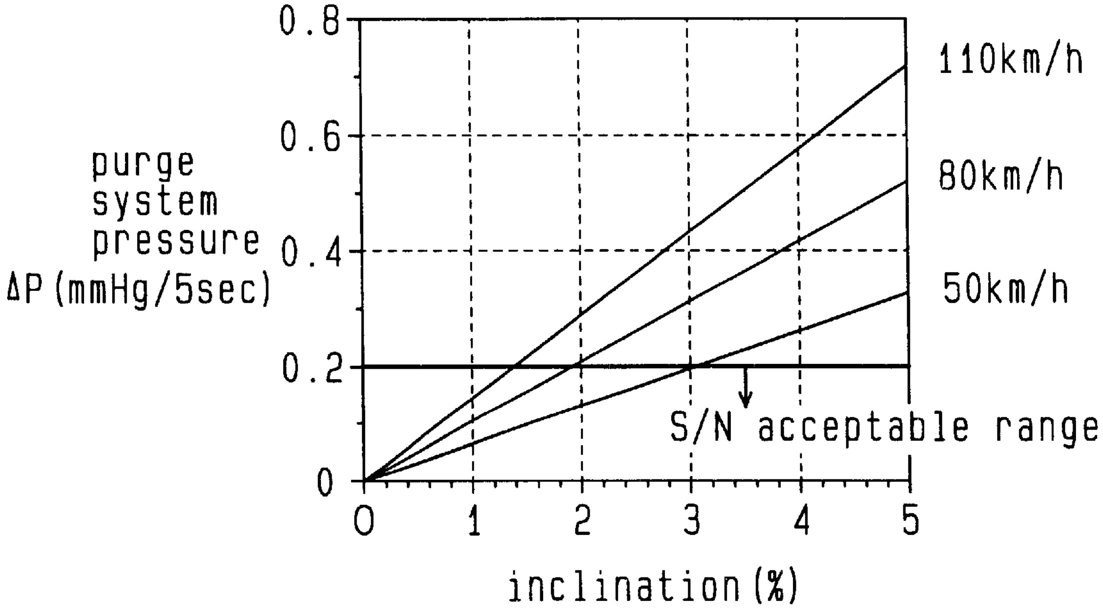
FIG. 17 is a graph showing changes of the pressure in the fuel vapor purge system of the fifth embodiment.
Figure 18:
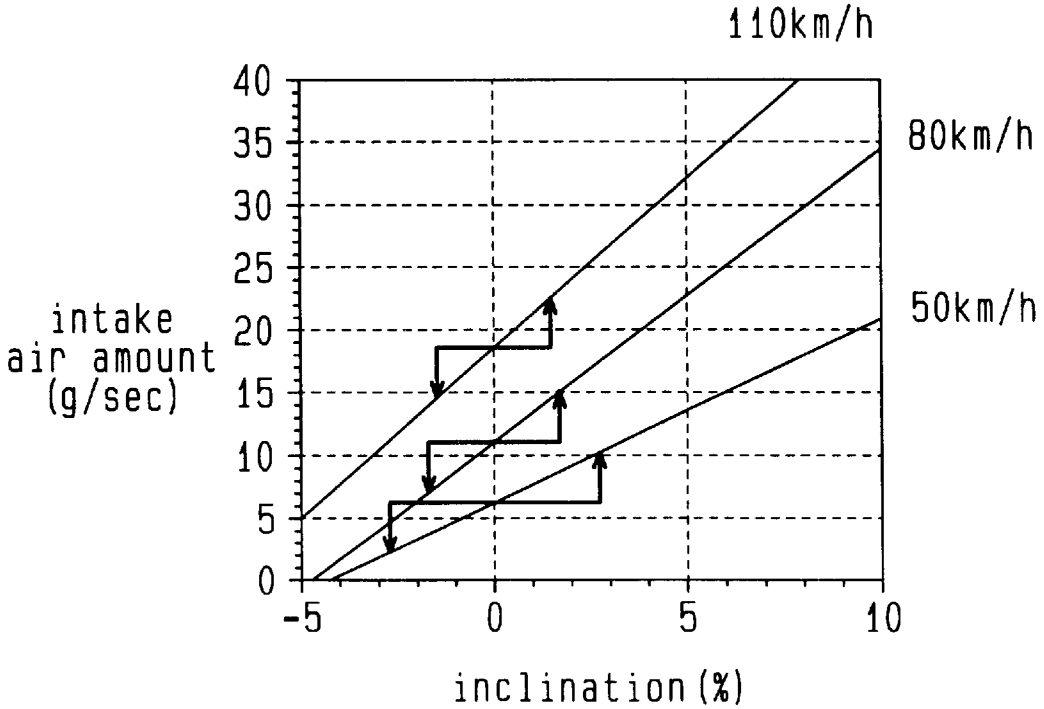
FIG. 18 is a graph showing the relationship between the degree inclination of a hill and the intake air amount in the fifth embodiment.

FIGS. 17 and 18 show how the threshold value of the changing amount $(Q_o-Q_B)$ changes to avoid erroneous diagnosis when the vehicle is going uphill or downhill.

When a purge system having a hole the diameter of which is approximately 0.5 mm is exposed to vacuum pressure and is then sealed for performing the malfunction diagnosis, the rate of pressure change is different from the rate of pressure change of a purge system having no leakage. Specifically, the difference of the pressure changing rate is approximately 0.2 mmHg per five seconds. Since the atmospheric pressure drops by 0.1 mmHg per meter of altitude, the difference of the pressure changing rate of 0.2 mmHg per five seconds corresponds to an altitude change of two meters in the period ΔTs, or five seconds. Therefore, if the vehicle's altitude is changed within two meters in five seconds, a minute hole having a hole the diameter of which is as small as 0.5 mm in the purge system 20 may be erroneously detected. The value 0.2 mmHg per five seconds will hereafter be referred to as an acceptable maximum pressure change due to altitude change.

FIG. 17 shows pressure changes in five seconds when the vehicle is moving uphill or downhill at three different speeds, or 50 km/h, 80 km/h and 110 km/h, at various inclination of a hill. A threshold inclination (acceptable inclination), below which the pressure change in five seconds is smaller than 0.2 mmHg/five seconds, is different for each speed. That is, the threshold inclination for 50 km/h is approximately 3%. The threshold inclination for 80 km/h is approximately 2%. The threshold inclination for 110 km/h is approximately 1.4%. Therefore, a hole the size of which is approximately 0.5 mm formed in the purge system 20 can be detected if the inclination of a hill is smaller than the threshold inclination at a certain speed.

FIG. 18 shows the relationship between the intake air amount and the inclination of a hill at the three speeds (50 km/h, 80 km/h and 110 km/h). Vertical arrows point to the thresh hold inclinations at each speed. Each arrow also represents the difference between the intake amount when the vehicle is moving on the level ground and the intake amount when the vehicle is moving on a hill of the corresponding threshold inclination. Although the threshold inclination is different for each speed, the difference of the intake air amount is approximately ±4 g/second for every speed as shown in FIG. 18.

The amount of intake air change ±4 g/second is accumulated to ±20 g in five seconds (±20 g/5 seconds). That is, the boundary of the intake air amount change ($Q_o$−$Q_B$) is ±20 g (±20 g/5 seconds). Thus, the following equation is satisfied.

$$-20\ g \leqq (Q_o - Q_B) < 20\ g \quad (5)$$

Limiting the range of the difference ($Q_o$−$Q_B$) eliminates the erroneous diagnosis when the vehicle is moving uphill or downhill.

However, in the actual use of the vehicle, such a limitation on the intake air amount change causes the diagnosis apparatus to perform diagnosis less frequently. In the fifth embodiment the equation (5) is modified as the following equation (6).

$$-50\ g \leqq (Q_o - Q_B) < 50\ g \quad (6)$$

When the difference ($Q_o$−$Q_B$) is in the range of the equation (6), the diagnosis standard is altered accordingly. Specifically, the boundary between the abnormality judgment region and the judgment deferment region in relation to the second rate of pressure change ΔP2 is changed as shown in FIG. 19.

Figures 19, 20:
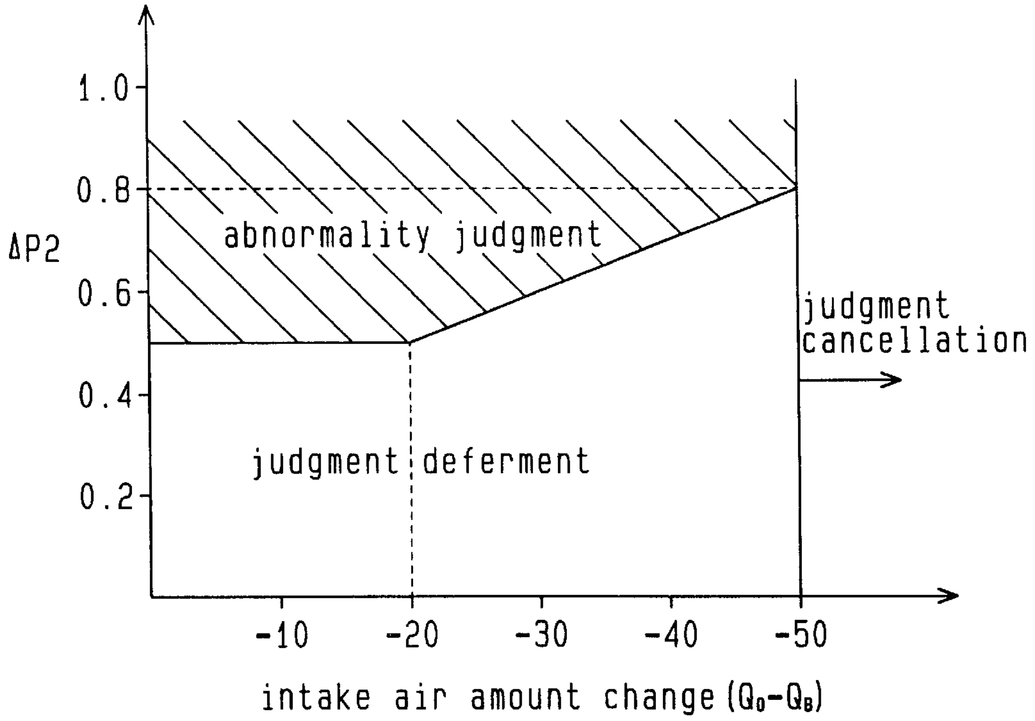
FIG. 19 is a compensation map used in the fifth embodiment.
FIG. 20 is a diagnosis aide map used in the fifth embodiment.

Like the map of FIG. 13, the map of FIG. 19 shows how the boundary between the judgment deferment region and the abnormality region in the map of FIG. 4 changes between the values R0 and R1 of the ratio ΔP1/ΔP2 in accordance with the intake air amount change ($Q_o$−$Q_B$). That is, the map of FIG. 19 shows that the boundary Z shown in maps of FIGS. 10(*a*) to 10(*c*) is continuously changed in accordance with the intake air amount change ($Q_o$−$Q_B$).

As shown in the map of FIG. 19, the boundary between the abnormality judgment region and the judgment deferment region is changed by 0.1 mmHg for every change of the intake amount.change of 10 g/5 seconds when the intake amount change is less than −20 g/5 seconds. The intake amount change of 10 g/5 seconds is only an example. The inventors have confirmed that in a typical vehicle the intake air amount is changed by 10 g per five seconds when the inclination of a hill changes such that the rate of pressure change ΔP is changed by 0.1 mmHg per five seconds regardless of the vehicle speed. For the maximum acceptable value of the intake air amount change ($Q_o$−$Q_B$) in the equation (6), or −50 g per five seconds, the boundary is shifted upward by 0.3 mmHg.

Figure 15A:
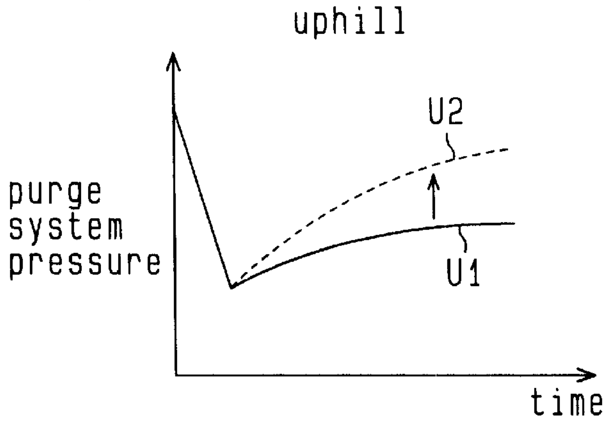
FIG. 15 is a timing chart showing changes of the pressure in the purge system according to the fourth embodiment when a vehicle is moving on a hill.
Figure 15B:
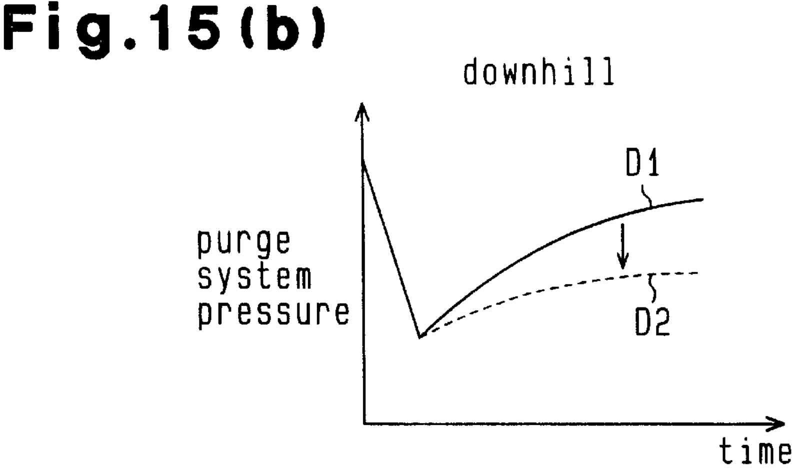
Figure 16:
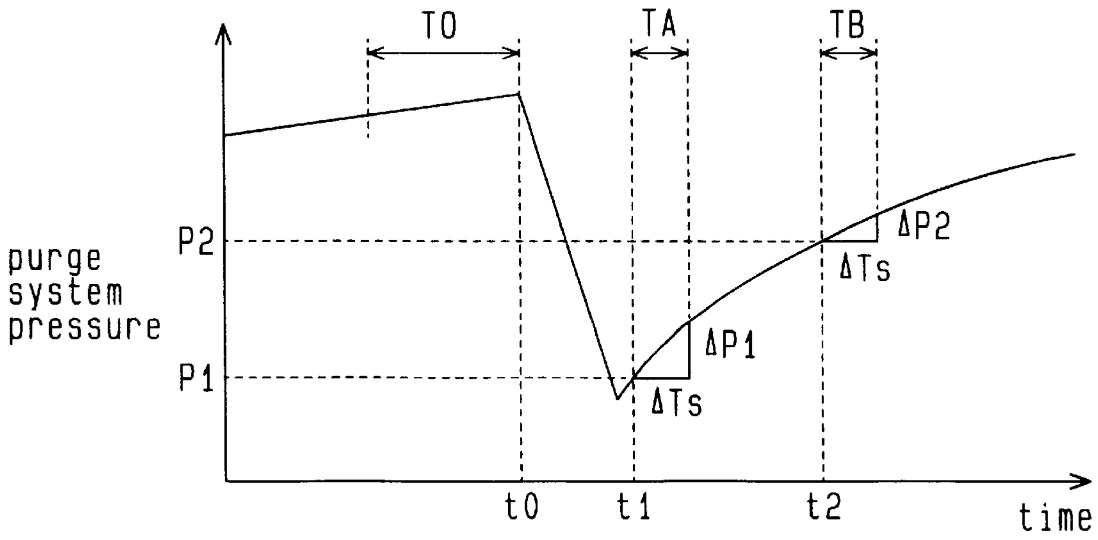
FIG. 16 is a timing chart showing changes of the pressure in a fuel vapor purge system according to a fifth embodiment of the present invention.

As shown in FIGS. 15(*a*) and 15(*b*), such adjustment to the map of FIG. 4 is required when an erroneous detection is likely to be made, that is, when the vehicle is going uphill and the intake amount change ($Q_o$−$Q_B$) is between −50 g and −20 g. Thus, in the diagnosis apparatus of the fifth embodiment, the purge system 20 is diagnosed based on the table of FIG. 20 using the maps of FIGS. 4 and 19. FIG. 20 shows a diagnosis aide table based on the intake amount change ($Q_o$−$Q_B$) when the vehicle speed is constant. The table will hereafter be described.

If the intake amount change ($Q_o$−$Q_B$) is out of the range of the equation (6), the ECU 50 cancels the diagnosis.

If the intake amount change ($Q_o$−$Q_B$) is in the range between −50 g and −20 g when the vehicle is going uphill, the map of FIG. 4 is adjusted based on the map of FIG. 19 and the malfunction diagnosis is executed based on the adjusted map of FIG. 4. In this case, the abnormality judgment is valid, and the normality judgment is invalid. If there is no abnormality, the abnormality judgment does not have to be made frequently. As in the chart of FIG. 15(*a*), the pressure change is likely to cause the ECU 50 to erroneously detect an abnormality. Therefore, if the purge system 20 is judged to be functioning normally, validating the judgment causes no problem.

If the intake amount change ($Q_o$−$Q_B$) is in a range between −20 g and 20 g when the vehicle is running on a level ground, the diagnosis judgment is made without adjusting the map of FIG. 4.

If the intake amount change ($Q_o$−$Q_B$) is between 20 g and 50*g* when the vehicle is going downhill, the abnormality judgment is validated, and the normality judgment is invalidated. This is because the purge system may be erroneously judged to be normal as shown in FIG. 15(*b*).

Figure 21:
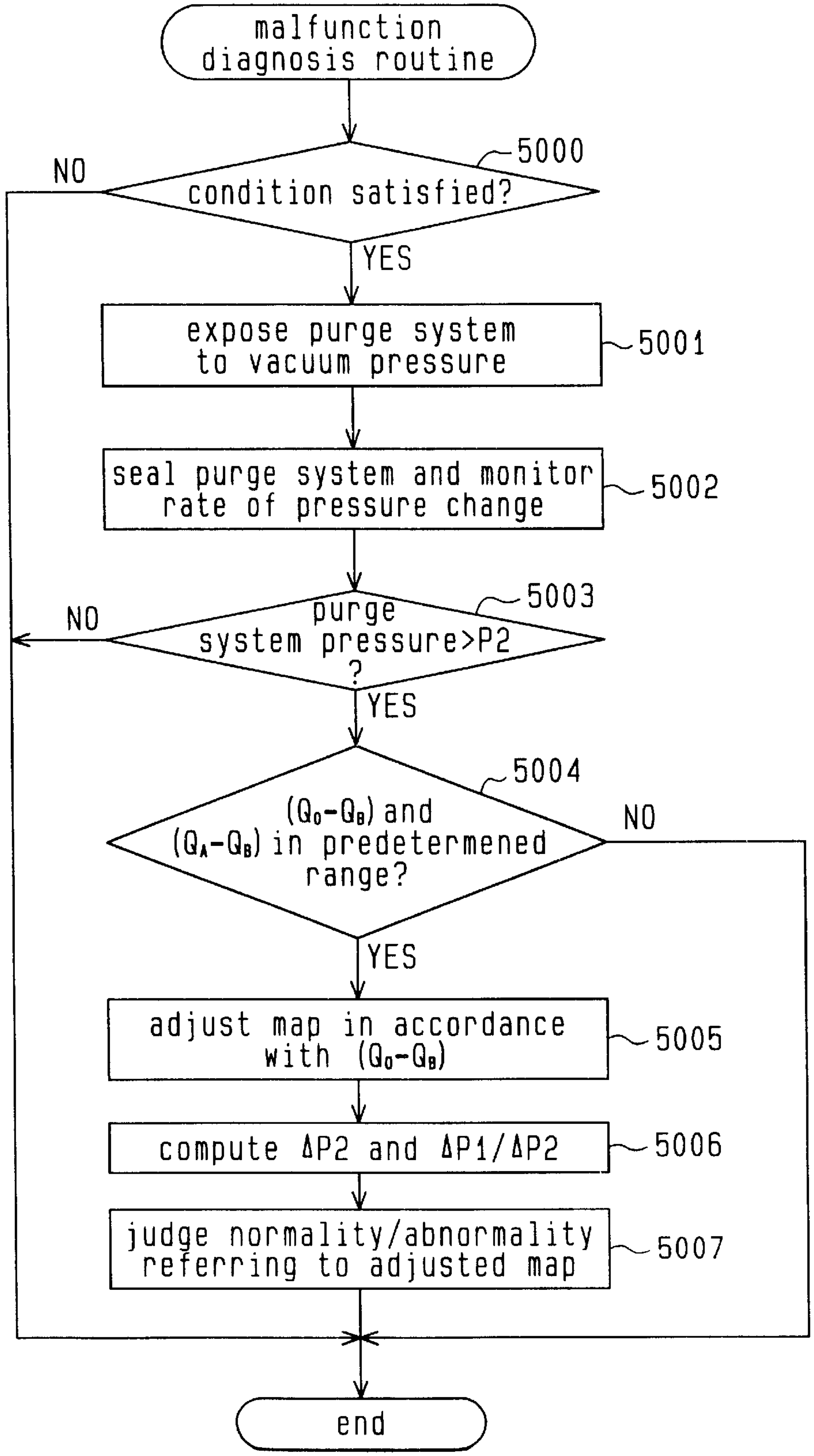
FIG. 21 is a flowchart showing a malfunction diagnosis routine according to the fifth embodiment.

FIG. 21 is a flowchart showing a malfunction diagnosis routine according to the fifth embodiment. The ECU 50 executes this routine at predetermined intervals as in the previous embodiments.

When entering this routine, the ECU 50 judges whether the conditions for executing the malfunction diagnosis are satisfied. If the conditions are satisfied, the ECU 50 moves to step 5001. At step 5001, the ECU 50 opens the purge valve 71*a* and closes the atmosphere intake valve 72*a*. Accordingly, the pressure in the purge system 20 is lowered to the first reference pressure value P1 by the vacuum pressure introduced from the intake passage 12. Step 5001 is performed until the pressure in the purge system 20 is lowered to the first reference pressure value P1 by using a flag. One of the conditions at step 5000 includes the condition (b2), which indicates whether the vehicle speed is not changing rapidly. The condition (b2) is satisfied when the intake air amount change and the vehicle speed change are in predetermined ranges in a period TO (condition confirmation period).

At step 5002, the ECU 50 closes the purge valve 71*a* for sealing the purge system and continually measures the rate of pressure change ΔP until the pressure in the purge system reaches the second reference pressure value P2 (P1<P2<atmospheric pressure) at predetermined intervals.

At step 5003, the ECU 50 judges whether the pressure in the purge system 20 reaches the second reference pressure value P2. If the pressure has reached the second reference pressure value P2, the ECU 50 moves to step 5004 and computes the intake amount change ($Q_o$−$Q_B$) between the period TO and the period TB and the intake amount change ($Q_A$−$Q_B$) between the period TA and the period TB. Then the ECU 50 judges whether the intake amount changes are in the predetermined range of the equation (6). If the intake amount changes are out of the predetermined ranges, the ECU 50 temporarily suspends the routine and cancels the current diagnosis.

On the other hand, if the intake air amount changes are in the predetermined range in step 5004, the ECU 50 moves to step 5005. At step 5005, the ECU 50 adjusts the detection map of FIG. 4 in accordance with the intake air amount ($Q_o$−$Q_B$) when the intake air amount ($Q_o$−$Q_B$) is in the range between −50 g and −20 g.

After adjusting the map, the ECU 50 moves to step 5006. At step 5006, the ECU 50 measures the rates of pressure change ΔP1 and ΔP2 and the ratio ΔP1/ΔP2. At step 5007, the ECU 50 judges whether there is abnormality in the purge system 20 based on the second rate of pressure change ΔP2 and ratio ΔP1/ΔP2 referring to the adjusted map of FIG. 4. At this time, the detection aide table of FIG. 20 is also used.

As described above, the fifth embodiment has the following advantages in addition to the advantages (1) and (2) of the first and second embodiments.

(13) The detection standard is adjusted in accordance with the change of the intake air amount before and after communicating the purge system 20 with vacuum pressure. Therefore, even if the vehicle is going uphill or downhill, erroneous diagnosis due to the change of the atmospheric pressure is avoided.

(14) The range of an intake air amount change to permit the diagnosis to be performed is significantly widened (±20 g per five seconds to ±50 g per five seconds). Therefore, the frequency of the diagnosis is increased not only when the vehicle is moving uphill or downhill but also when the vehicle is running on a level ground.

(15) Whether the vehicle is moving uphill or downhill is distinguished by monitoring the intake air amount change before and after the purge system 20 is exposed to the vacuum pressure. This eliminates the necessity for an atmospheric pressure sensor.

The range of the intake air amount change ($Q_o$–$Q_B$) to permit the diagnosis to be performed may be altered. The boundary between the abnormality judgment region and the judgment deferment region may be changed in any manner based on the intake air amount change ($Q_o$–$Q_B$). For example, the boundary may be changed by selecting a map suitable for the type of a vehicle.

In the fifth embodiment, the diagnosis standard is adjusted based on the intake air amount change ($Q_o$–$Q_B$) when the vehicle speed is constant. The intake air amount is changed also by a change of the vehicle speed. Therefore, the intake air amount change due to a vehicle speed change may be considered, which will permits the diagnosis to be performed more frequently when the vehicle is running on a level ground.

A diagnosis apparatus according to a six embodiment will now be described. The difference from the fourth and fifth embodiments will mainly be discussed below.

Normally, a diagnosis apparatus for a fuel vapor purge system does not repeat the diagnosis when a normality judgment or an abnormality judgment is made in one trip of the engine. One trip refers to a period from when the engine is accelerated from an idling state to when the engine is back to an idling state. Also, the apparatus does not repeat the diagnosis when the diagnosis is deferred in one trip. This is because if the diagnosis is deferred, the result of the next diagnosis is often the same as the result of the first diagnosis in the current trip. However, if the malfunction diagnosis in one trip is deferred due to a change to the diagnosis standard as in the fourth and fifth embodiments, a later diagnosis in the current trip would probably result in a normality or abnormality judgment. In the sixth embodiment, if the malfunction diagnosis is deferred due to a change of the diagnosis standard, the purge system 20 will be exposed to the vacuum pressure again for performing another diagnosis in the same trip.

Figure 22:
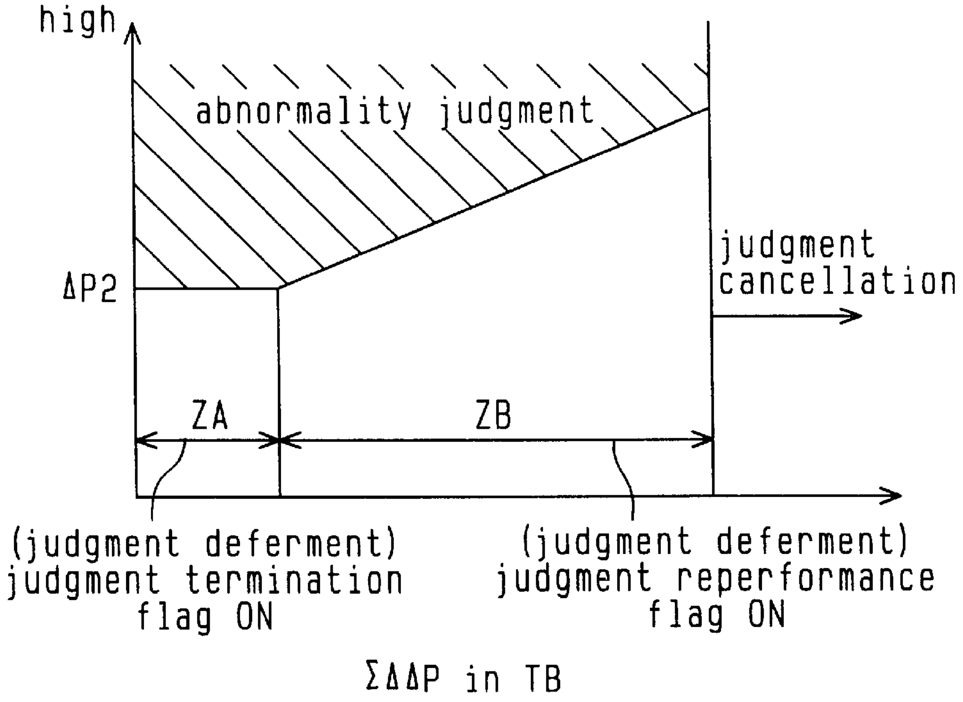
FIG. 22 is a compensation map used in a malfunction diagnosis according to a sixth embodiment.

In the fourth embodiment, the diagnosis standard is adjusted in accordance with the fluctuation amount ΣΔΔP in the period TB. FIG. 22 is a map showing the adjusted detection standard. The detection deferment region of the map of FIG. 13 is divided into two regions, or regions ZA and ZB. The region ZA corresponds to smaller fluctuation amount ΣΔΔP and constant rate of pressure change ΔP2. The region ZB corresponds to greater fluctuation amount ΣΔΔP and changing rate of pressure change ΔP2. If the judgment is deferred based on the map of FIG. 4 adjusted in accordance with the map of FIG. 22, the ECU 50 judges whether the coordinates between the second rate of pressure change ΔP2 and the fluctuation amount ΣΔΔP is in region ZA or region ZB.

Figure 23:
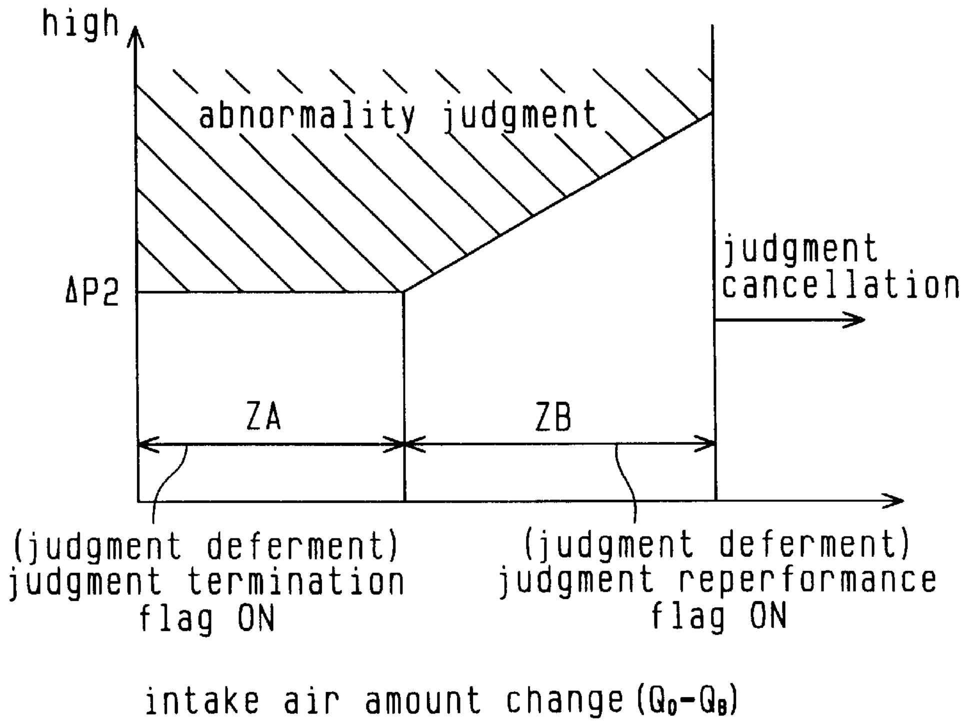
FIG. 23 is a compensation map used in the malfunction diagnosis of the sixth embodiment.

If the diagnosis standard is adjusted in the manner of the fifth embodiment using the map of FIG. 19, the detection deferment region is also divided into regions ZA and ZB as in FIG. 23. The region ZA corresponds to smaller intake air amount change ($Q_o$–$Q_B$) and constant rate of pressure change ΔP2. The region ZB corresponds to greater intake air amount change ($Q_o$–$Q_B$) and changing rate of pressure change ΔP2. If the judgment is deferred based on the map of FIG. 4 adjusted in accordance with the map of FIG. 23, the ECU 50 judges whether the coordinates of the second rate of pressure change ΔP2 and the intake air amount change ($Q_o$–$Q_B$) is in region ZA or region ZB.

In either case, if the judgment is deferred based on the coordinates in region ZB, a judgment redo flag is set to ON. Accordingly, the purge system 20 is exposed to the vacuum pressure again and the diagnosis is executed again. If the judgment is deferred based on the coordinates in region ZA, a judgment termination flag is set to ON. Accordingly, the diagnosis in the current trip is terminated.

Figure 24:
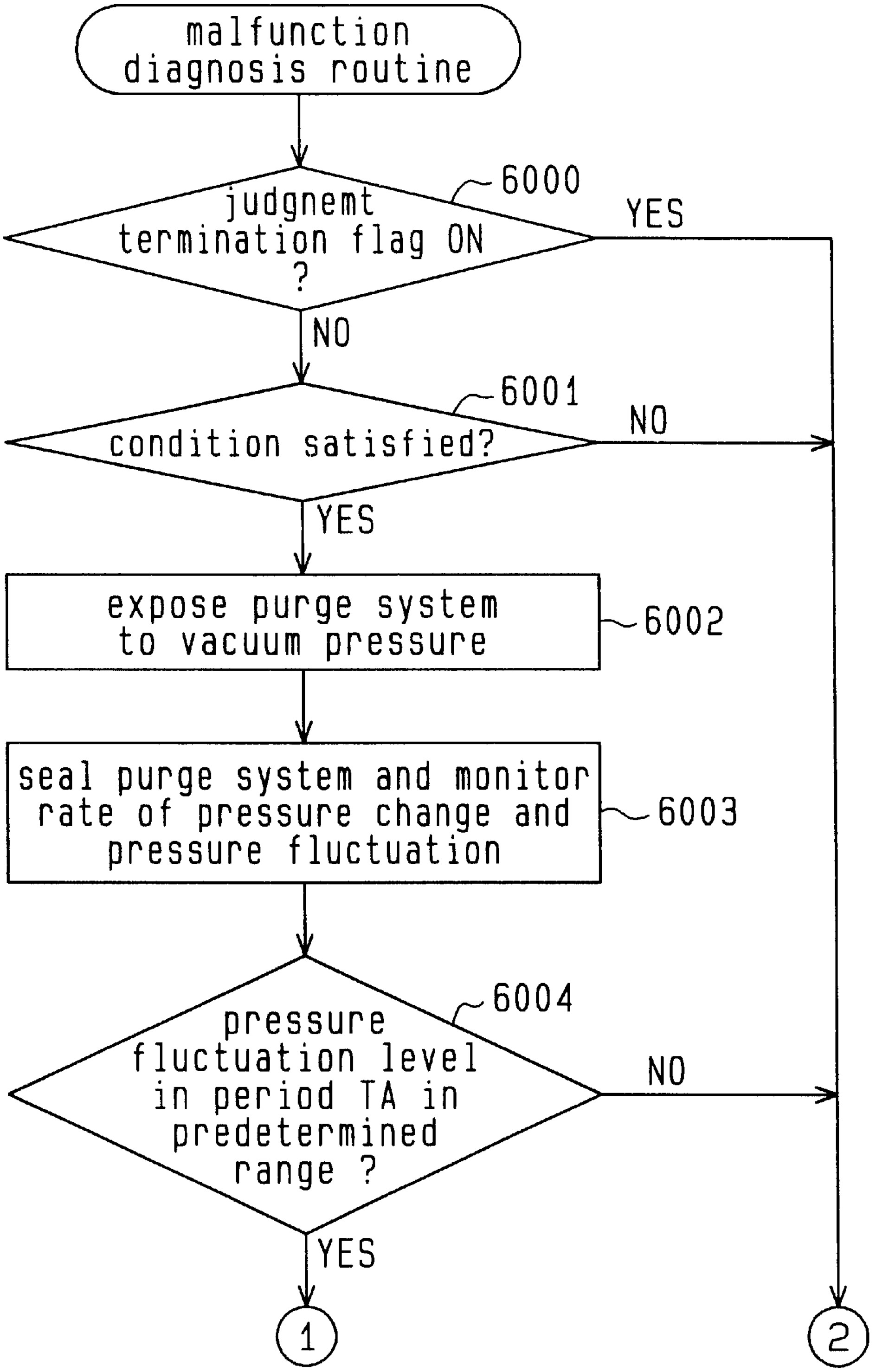
FIG. 24 is a flowchart showing a malfunction diagnosis routine of the sixth embodiment.
Figure 25:
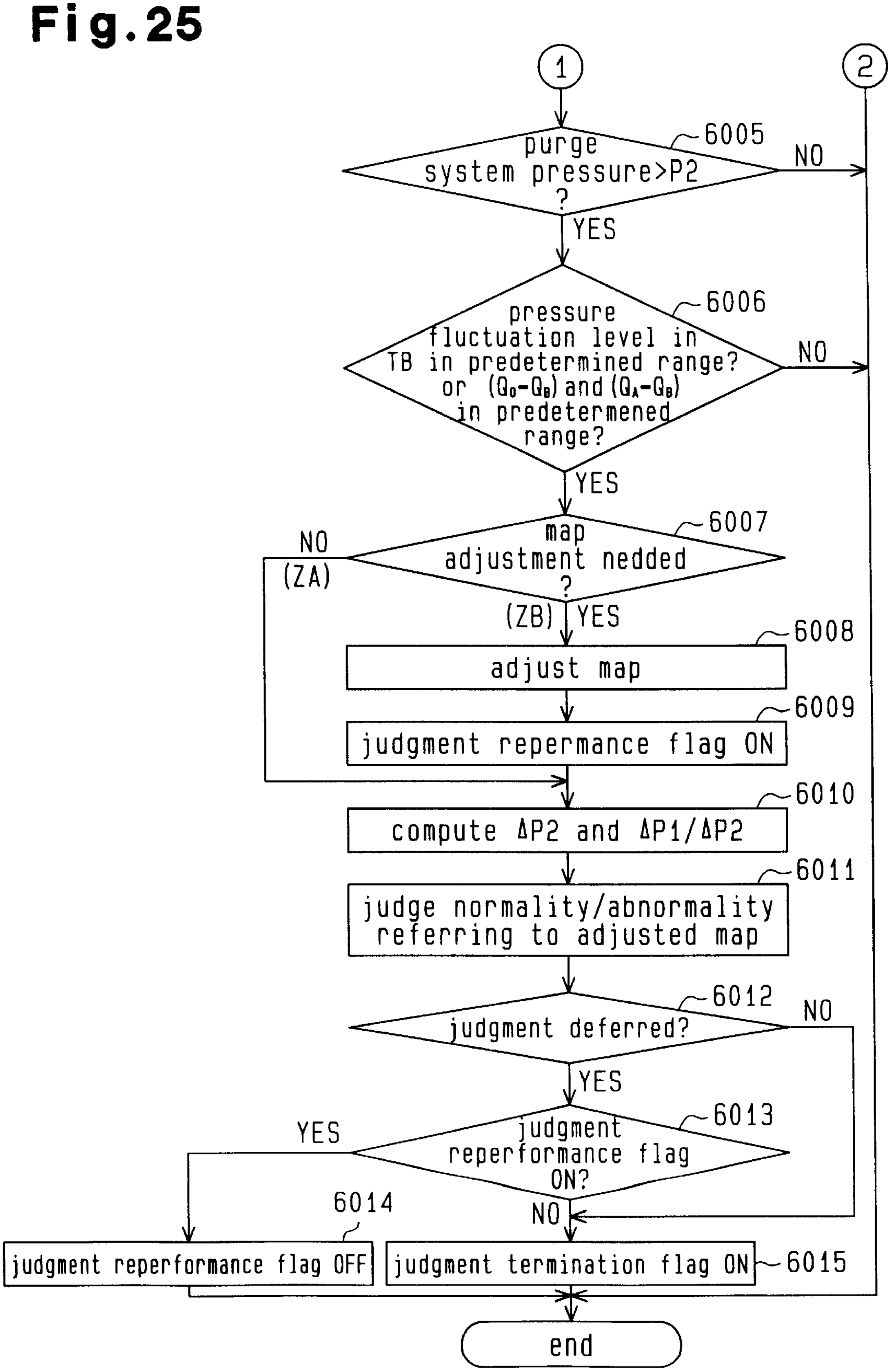
FIG. 25 is a flowchart showing a malfunction diagnosis routine of the sixth embodiment.

The diagnosis according to the sixth embodiment will now be described with reference to FIGS. 24 and 25. As in the previous embodiments, the ECU 50 executes the routine at predetermined intervals.

When entering this routine, the ECU 50 judges whether the judgment termination flag is ON at step 6000. If the judgment termination flag is ON, the ECU 50 terminates the routine.

If the judgment termination flag is not ON, the ECU 50 judges whether the conditions for performing the malfunction diagnosis are satisfied at steps 6001. If the conditions are satisfied, the ECU 50 moves to step 6002. At step 6002, the ECU 50 opens the purge valve 71*a* and opens the atmosphere intake valve 72*a* to communicate the purge system 20 with vacuum pressure of the intake passage 12 thereby lowing the pressure in the purge system 20 to the predetermined pressure value P1. Step 6002 is executed using a flag until the pressure in the purge system is lowered to the first reference pressure value P1. As in the fifth embodiment, one of the conditions at step 6001 includes the condition (b2), which indicates whether the vehicle speed is not changing rapidly. The condition (b2) is satisfied when the intake air amount change and the vehicle speed change are in predetermined ranges in the period TO (conditions confirmation period).

At step 6003, the ECU 50 closes the purge valve 71*a* to seal the purge system 20. Further, the ECU 50 repeatedly measures rate of pressure change ΔP and the pressure fluctuation at predetermined intervals until the pressure reaches the second reference pressure value P2 (P1<P2<atmospheric pressure).

At step 6004, the ECU 50 judges whether the pressure fluctuation measured in the period TA, at which the rate of pressure change ΔP1 of the first reference pressure value P1 is computed, is in a predetermined range. If the measured pressure fluctuation is not in the predetermined range, the ECU 50 temporarily suspends the routine and stops the diagnosis.

If the measured pressure fluctuation is in the predetermined range, the ECU 50 moves to step 6005. At step 6005, the ECU 50 judges whether the pressure in the purge system has reached the second reference pressure value P2. If the pressure has reached the second reference pressure value P2, the ECU 50 moves to step 6006. At step 6006, the ECU 50 judges whether the pressure fluctuation level measured in the period TB is in a predetermined range. The ECU 50 also judges whether the intake air amount change $(Q_o - Q_B)$ and the intake air amount change $(Q_A - Q_B)$ are in the range of the equation (6). If the pressure fluctuation and the intake amount changes are not in the predetermined range, the ECU 50 suspends the current routine and terminates the diagnosis.

If the pressure fluctuation level and the intake air amount changes are in the predetermined ranges, the ECU 50 moves to step 6007. At step 6007, the ECU 50 judges whether the coordinates of the second rate of pressure change ΔP2 and the pressure fluctuation amount ΣΔΔP is in region ZA or ZB in the map of FIG. 22. Also, the ECU 50 judges whether the coordinates of the second rate of pressure change ΔP2 and the intake air amount change $(Q_o - Q_B)$ is in region ZA or region ZB in the map of FIG. 23. In other words, the ECU 50 judges whether the map of FIG. 4 must be adjusted in accordance with the map of FIG. 22 or with the map of FIG. 23 at step 6007.

If the fluctuation amount ΣΔΔP or the intake amount change $(Q_o - Q_B)$ is in the corresponding region ZB, the ECU 50 adjusts the map of FIG. 4 in accordance with the fluctuation amount ΣΔΔP or the intake amount change $(Q_o - Q_B)$ at step 6008. Further, the ECU 50 sets the judgment redo flag ON. At step 6010, the ECU 50 measures the rates of pressure change ΔP1 and ΔP2 and computes the ratio ΔP1/ΔP2. At step 6011, the ECU 50 diagnoses the purge system 20 based on the second rate of pressure change ΔP2 and the ratio ΔP1/ΔP2 referring to the adjusted map of FIG. 4. That is, the ECU 50 judges whether there is malfunction in the purge system 20 or whether the judgment must be deferred.

If the fluctuation amount ΣΔΔP or the intake amount change $(Q_o - Q_B)$ is in the corresponding region ZA, the ECU 50 moves to step 6010 without adjusting the map of FIG. 4 and without setting the judgment redo flag ON. At step 6010, the ECU 50 measures the rates of pressure change ΔP1 and ΔP2 and computes the ratio ΔP1/ΔP2. At step 6011, the ECU 50 diagnoses the purge system based on the second rate of pressure change ΔP2 and the ratio ΔP1/ΔP2 referring to the adjusted map. That is, the ECU 50 judges whether there is malfunction in the purge system 20 or whether the judgment must be deferred.

Thereafter, at step 6012, the ECU 50 judges whether the result of step 6011 is a judgment deferment. If the result is deferment, the ECU 50 moves to step 6013 and judges whether the judgment redo flag is ON. If the redo flag is ON, the ECU 50 moves to step 6014 and turns the flag OFF then terminates the routine. In this case, as long as the conditions for executing the diagnosis are satisfied, the diagnosis can be repeatedly performed in the current routine by communicating the purge system 20 with vacuum pressure.

If the determination at step 6011 is not judgment deferment, the ECU 50 moves to step 6013 and turns the judgment termination flag on. Also, even if determination at step 6011 is judgment deferment, the ECU 50 moves to step 6015 and turns the judgment termination on when the judgment redo flag is not on. Then, the ECU 50 terminates the routine. In this case, the diagnosis in the current trip is stopped.

In addition to the advantages (11) to (15) of the fourth and fifth embodiment, the sixth embodiment has the following advantages.

(16) When the malfunction diagnosis is deferred due to a change on the diagnosis standard, the diagnosis can be performed again by communicating the purge system 20 with vacuum pressure, which increases the number of diagnosis performed when the vehicle is moving.

(17) When the judgment of malfunction is deferred without changing the diagnosis standard, the diagnosis is stopped in the current trip. Accordingly, unnecessary diagnosis is avoided, which guarantees the total amount of purged fuel.

In the sixth embodiment, the judgment redo flag is applied to the fourth and fifth embodiments. However, the judgment redo flag may be effectively applied to any diagnosis apparatus that changes the diagnosis standard.

The judgment redo flag may be applied to either one of the fourth embodiment and the fifth embodiment. Alternatively, the judgment redo flag may be applied to the third embodiment. In this case, the judgment redo flag is set to on when the map of FIGS. 10(*b*) or 10(*c*) are used and the judgment is deferred. When the map of FIG. 10(*a*) is selected and the judgment is deferred, the judgment termination flag is set to on.

A diagnosis apparatus according to a seventh embodiment will now be described. The difference from the first to sixth embodiment will mainly be discussed.

In a diagnosis apparatus, fuel vapor cannot be purged during a diagnosis. Thus, the number of diagnosis, which a purge system is exposed to the vacuum pressure of an intake passage, is limited, for example, up to seven times per trip. Therefore, the times of introducing intake pressure is limited to, for example, eight times per trip. Therefore, in an actual use, if the diagnosis is repeatedly stopped due to pressure fluctuations in the purge system, the diagnosis is not performed frequently.

In the seventh embodiment, another condition for communicating the purge system 20 with vacuum pressure, or for starting the diagnosis, is employed. The new condition is whether the accumulated value of the pressure fluctuation in the purge system 20 is smaller than a predetermined value thα. Thus, once the purge system 20 is exposed to the vacuum pressures and the diagnosis is started, the diagnosis is completed most of the times.

Figures 26A, 26B, 26C, 26D:
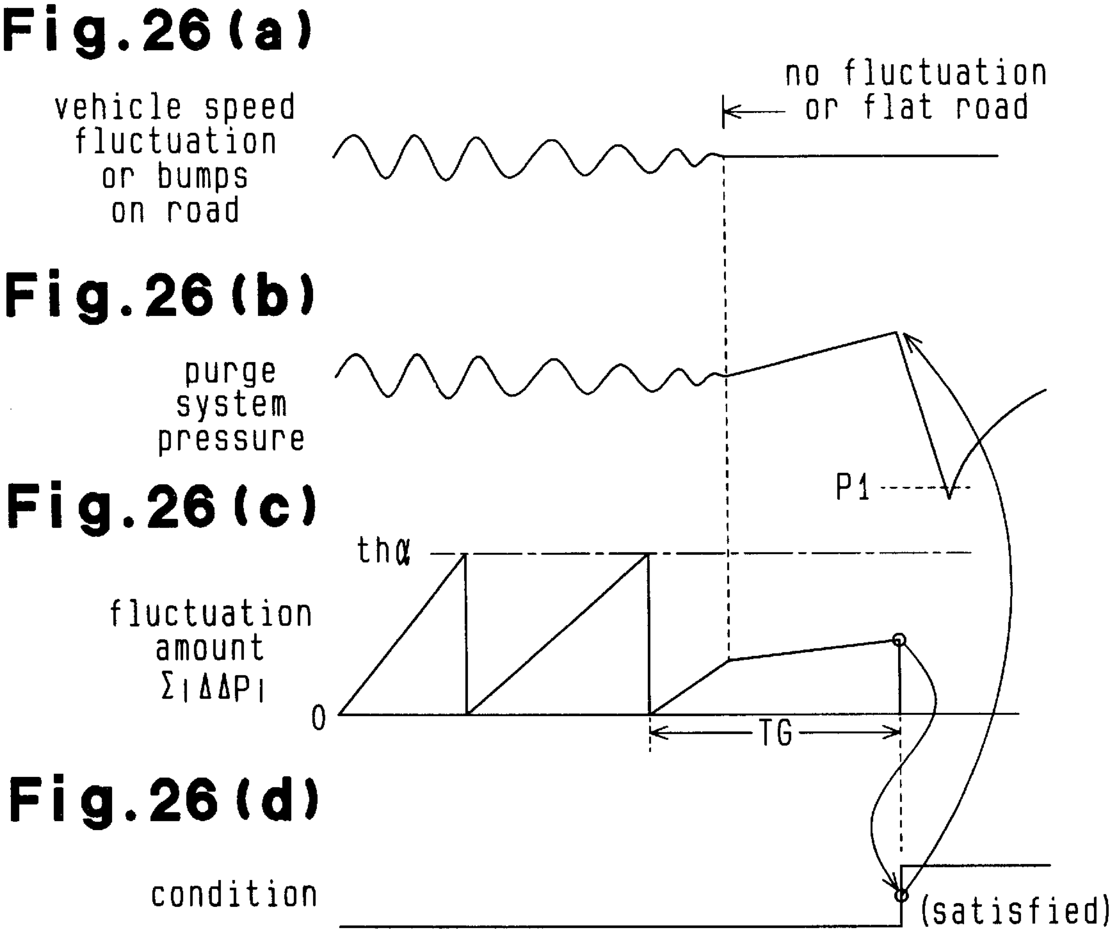
FIG. 26 is a timing chart showing when a diagnosis condition according to a seventh embodiment is satisfied.

As shown in FIG. 26, fluctuations of the vehicle speed and bumps on the road surface cause the pressure in the purge system 20 to fluctuate. FIG. 26(*c*) shows the accumulated value (fluctuation amount) Σ|ΔΔP| of the pressure in the purge system 20. The accumulated value Σ|ΔΔP| is likely to exceed the value thα within a predetermined period TG (for example, thirty seconds). If the accumulated value Σ|ΔΔP| exceeds the value thα in the period TG, the purge system 20 is not exposed to the vacuum pressure. Thereafter, when the vehicle speed does not fluctuate or when the road surface is flat and the pressure fluctuation is subsided, the accumulated value Σ|ΔΔP| is not likely to exceed the value thα within the period TG. If the accumulated value Σ|ΔΔP| does not exceed the value thα within the period TG, the condition is satisfied, and the purge system 20 is exposed to the vacuum pressure as shown in FIG. 26(*d*).

Figure 27:
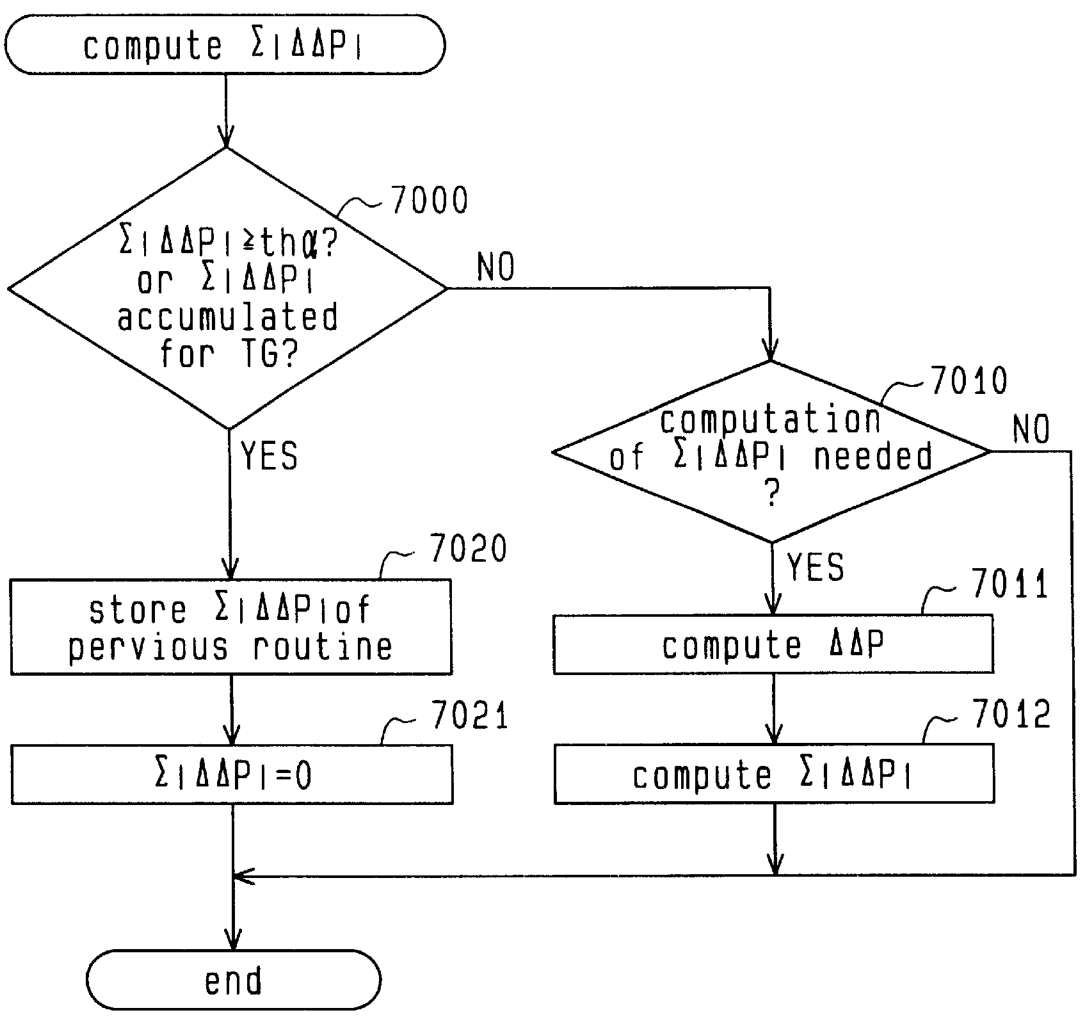
FIG. 27 is flowchart showing a routine for computing a vibration amount $\Sigma|\Delta\Delta P|$ according to the seventh embodiment.

FIG. 27 is a flowchart for computing the accumulated value Σ|ΔΔP| of the pressure fluctuation. The ECU 50 executes this routine at predetermined intervals.

When entering this routine, the ECU 50 judges whether the current accumulated value Σ|ΔΔP| is equal to or greater than the value thα and whether the accumulated value Σ|ΔΔP| is accumulated for the period TG at step 7000. If the determination is negative at step 7000, the ECU 50 moves to step 7010 and judges whether the accumulated value Σ|ΔΔP| needs to be computed in the current routine. That is, the ECU 50 computes the accumulated value Σ|ΔΔP| once every a certain number of the routine executions, and the ECU 50 judges whether the computation must be executed in the current routine at step 7010. For example, if the routine of FIG. 27 is executed at every sixty-five milliseconds, the accumulated value Σ|ΔΔP| is computed at every eighth routine. If the determination is negative at step 7010, the ECU 50 terminates the routine.

If the determination is positive at step 7010, the ECU 50 moves to step 7011 and computes the pressure fluctuation level ΔΔP in the purge system 20. At step 7012, the ECU 50 computes the fluctuation amount Σ|ΔΔP|. Thereafter, the ECU 50 temporarily terminates the routine. The pressure fluctuation level ΔΔP in the purge system 20 is computed by applying second order differentiation to a change of the pressure detected by the pressure sensor 32. The second order differentiation value ΔΔP represents the fluctuation of the fuel vapor pressure due to turning, speed changes and swinging of the vehicle.

If the determination at step 7000 is positive, the ECU 50 moves to step 7020 and stores the fluctuation amount Σ|ΔΔP| computed in the previous execution of the routine in the RAM 51*c*. At step 7021, the ECU 50 resets the fluctuation amount Σ|ΔΔP| in the current routine to zero.

Repeated execution of the routine of FIG. 27 shows that the fluctuation amount Σ|ΔΔP| changes as in FIG. 26(*c*) when the purge system pressure changes as in FIG. (*b*) due to pressure speed change or bumps on the road surface of FIG. 26(*a*).

Figure 28:
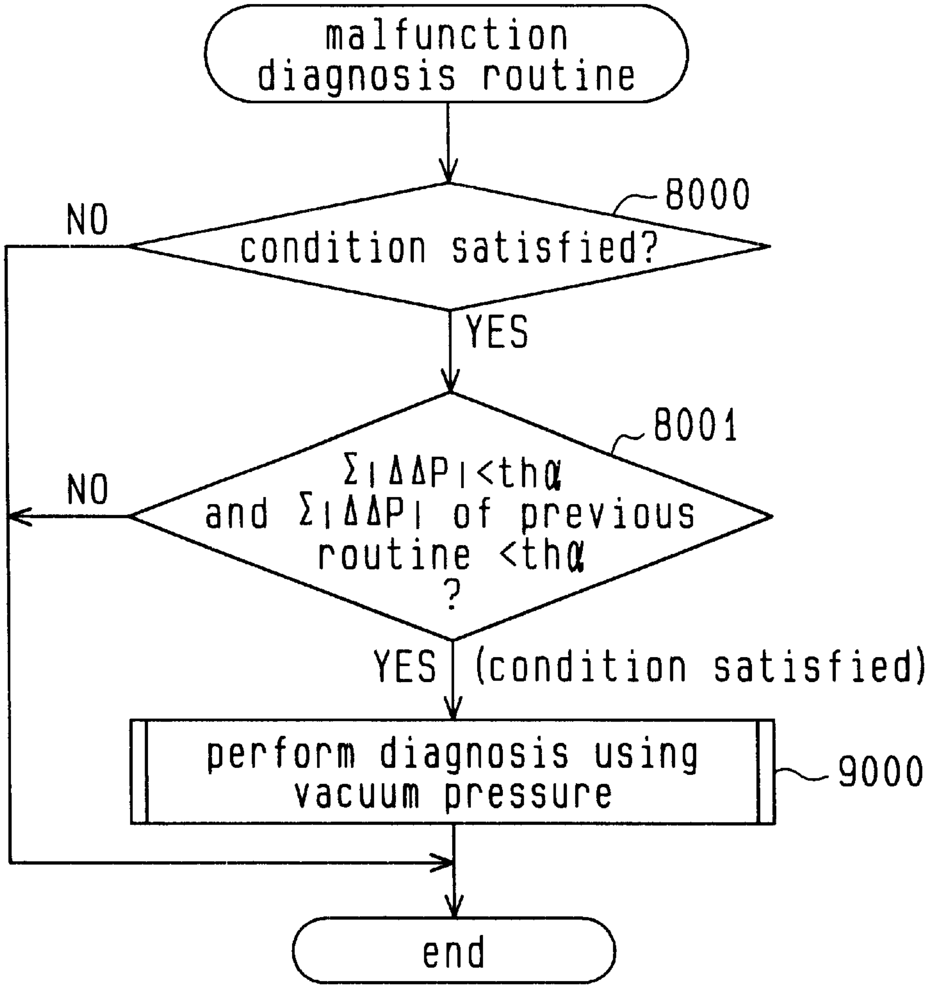
FIG. 28 is a flowchart showing a malfunction diagnosis routine according to the seventh embodiment.

FIG. 28 is a flowchart of a malfunction diagnosis routine according to a seventh embodiment. The ECU 50 executes the routine at predetermined intervals.

When entering this routine, the ECU 50 judges whether the conditions (b1) to (b3) are satisfied. If the conditions are not satisfied, the ECU 50 temporarily suspends the routine.

If the determination of step 8000 is positive, the ECU 50 moves to step 8001. At step 8001, the ECU 50 judges whether the fluctuation amount Σ|ΔΔP| computed in the routine of FIG. 27 is smaller than the value thα and the fluctuation amount Σ|ΔΔP| of the previous routine, which is stored in the RAM 51*c*, is smaller than the value thα. That is, the conditions for initiating the diagnosis are satisfied only when the determinations of steps 8000 and 8001 are both positive.

If the conditions are satisfied, the ECU 50 executes the diagnosis according to one of the first to sixth embodiments at step 9000.

In the seventh embodiment, the ECU 50 executing steps 8000 and 8001 form a condition monitoring means for determining whether the purge system 20 needs to be exposed to the vacuum pressure.

In addition to the advantages (1) to (17) of the first to sixth embodiments, the seventh embodiment has the following advantages.

(18) Employing the condition monitoring means is likely to decrease the times of communicating the purge system 20 with vacuum pressure. However, once the conditions are satisfied at step 8001 and the purge system 20 is exposed to the vacuum pressure for initiating the diagnosis, the diagnosis is very likely to be completed.

(19) If the diagnosis is completed, the diagnosis does not need to be executed in the current trip, which guarantees a sufficient purge amount.

In the seventh embodiment, the value thα is a fixed value. However, the value thα may be varied in accordance with the degree of a detected malfunction. The degree of a detected malfunction may be determined by the size of a hole. For example, the value thα may be different when detecting hole larger than 0.5 mm from when detecting holes larger than 1.0 mm. When the degree of a detected malfunction is changed, conditions for the diagnosis other than the value thα are also often changed. By varying the value thα in accordance with the degree of detected malfunction, the number of communicating the purge system 20 with vacuum pressure can be increased when detecting relatively large holes, which, for example, have a size greater than 1.0 mm. Therefore, even if the condition monitoring means is employed, the diagnosis is flexibly employed in accordance with the degree of detected malfunction.

Although only seven embodiments of the present invention have been described herein, it should be apparent to those skilled in the art that the present invention may be embodied in many other specific forms without departing from the spirit or scope of the invention. Particularly, it should be understood that the invention may be embodied in the following forms.

In the first to seventh embodiments, the pressure sensor 32 is located in the ceiling of the fuel tank 30. However, the pressure sensor 32 may be located at any place as long as the sensor 32 can detect the pressure in the purge system 20. For example, the sensor 32 may be located in one of the passages or in the wall of the canister 40.

In the first to seventh embodiments, the intake pressure valve 80*a* is open and the atmosphere valve 72*a* is closed when initiating the diagnosis of the purge system 20. Then, the purge valve 71*a* is open to communicate the purge system 20 with vacuum pressure. However, other structures for diagnosing the purge system may be used as long as the purge system 20 is exposed to the vacuum pressure and is then sealed.

In the illustrated embodiments, the purge system 20 is first exposed to the vacuum pressure until the purge system pressure is lowered to the first reference pressure value P1 and is then sealed. Thereafter, the pressure is permitted to reach the second reference pressure value P2. The rate of pressure change ΔP1 when the purge system pressure is the first reference pressure value P1 and the second rate of pressure change ΔP2 when the purge system pressure is the second reference pressure value P2 are detected. Then, the ratio ΔP1/ΔP2 is computed. Whether there is a leak in the purge system 20 is judged based on the ratio ΔP1/ΔP2. The reference pressure values P1 and P2 are set in relation to 760 mmHg. The inventors have confirmed that it is preferable to set the first reference pressure value P1 to 98 kPa, or 20 mmHg less than 760 mmHg, and to set the second reference pressure value P2 to 99 kPa, or 15 mmHg less than 760 mmHg. However, the first and second reference pressure values P1 and P2 may be changed in accordance with the structure and the physical characteristics of the purge system 20. Further, instead of diagnosing the purge system by using the reference pressure values P1 and P2, the diagnosis may be executed by using three or more reference pressure values.

In the illustrated embodiments, the diagnosis is performed using the rates of pressure change ΔP2 and ΔP2. However, the diagnosis may be performed using any parameters that represent pressure change in the purge system 20. For example, the diagnosis may be performed based on the rate of pressure change or pressure changing amount in a certain period.

In the first embodiment, the reference period ΔT1 is used. In the second embodiment, the period ΔTh and the third reference pressure Value Ph are used. The diagnosis using values ΔT1, ΔTh and Ph may be employed in the third to sixth embodiments. If a process using values ΔT1, ΔTh and Ph is added to the third to sixth embodiments, a step for executing the process needs to be added before step 3004 of the third embodiment, before step 4004 of the fourth embodiment, before step 5003 of the fifth embodiment, and before step 6005 of the sixth embodiment. However, the normality judgment procedure using the period ΔT1 in the first embodiment may be omitted. Also, the normality judgment procedure using the period ΔTh and the third reference pressure value Ph in the second embodiment may be omitted.

The diagnosis of the fourth embodiment and the diagnosis of the fifth embodiment may be combined. In this case, it is preferable to perform the diagnosis in the manner of the sixth embodiment to increase the times of the diagnosis.

In the illustrated embodiments, the conditions (b1) to (b3) are used to judge whether the diagnosis can be started. In addition to the conditions (b1) to (b3), the following conditions (b4) to (b7) may be used:

(b4) Whether the vehicle is at an altitude equal to or higher than 2400 m.

(b5) The temperature in the purge system 20 when the engine is started is in a predetermined range, for example, form ten to thirty-five degrees centigrade.

(b6) The voltage of the vehicle battery is equal to or greater than a predetermined value, for example, eleven volts.

(b7) A predetermined time, for example, fifty minutes, has not elapsed since the engine is started.

In the illustrated embodiments, the purge system 20 is exposed to the vacuum pressure, or intake pressure, for initiating the diagnosis of the purge system 20. However, the purge system 20 may be exposed to a pressure higher than the atmospheric pressure. In this case, the purge system pressure is increased to a reference value and then the purge system is sealed. Thereafter, the pressure change in the purge system is monitored. As in the illustrated embodiments, the rate of pressure change at a few times are detected. The ratio of the detected rates of pressure change is computed. The malfunction is diagnosed based on the rate of pressure change and the ratio of the rate of pressure change. However, the diagnosis apparatus using vacuum pressure has a simpler structure compared to an apparatus using a pressure higher than the atmospheric pressure and is therefore easy to be installed in a vehicle.

Therefore, the present examples and embodiments are to be considered as illustrative and not restrictive and the invention is not to be limited to the details given herein, but may be modified within the scope and equivalence of the appended claims.

What is claimed is:

1. A diagnosis apparatus for a fuel vapor purge system that includes a fuel tank for storing fuel and supplies fuel vapor from the rank to an air-intake passage of an engine, wherein the diagnosis apparatus determines whether the fuel vapor purge system has a malfunction, the apparatus comprising:

a pressure sensor for detecting purge system pressure in the fuel vapor purge system;

a pressure changing means for changing the purge system pressure to a predetermined level; and a diagnosis means for diagnosing the fuel vapor purge system, wherein the diagnosis means closes the fuel vapor purge system after the purge system pressure has been changed by using the pressure changing means, measuring a first rate of pressure change when the purge system pressure approaches a predetermined first reference pressure, and for measuring a second rate of pressure change when the purge system pressure approaches a predetermined second reference pressure, wherein the second reference pressure differs from the first reference pressure, and the second reference pressure value is closer to the purge system pressure before the purge system pressure was changed by the pressure changing means than the first reference pressure, and wherein the diagnosis means judges whether the fuel vapor purge system has a malfunction based on the ratio of the first rate to the second rate.

2. The diagnosis apparatus according to claim 1, wherein the diagnosis means judges whether the purge system has a malfunction base d on the second rate of pressure change and the ratio.

3. The diagnosis apparatus according to claim 1, wherein the pressure changing means is a control valve that switches between a vacuum state where the fuel vapor purge system is communicated with the air-intake passage or a closed state where the fuel vapor purge system is sealed from the air-intake passage.

4. The diagnosis apparatus according to claim 1, wherein the diagnosis means judges that the fuel vapor purge system has no malfunction when a period of time during which the purge system pressure changes from the first reference pressure to the second reference pressure is equal or longer than a predetermined period.

5. The diagnosis apparatus according to claim 1, wherein the diagnosis means judges that the fuel vapor purge system has no malfunction when the purge system pressure is lower than a predetermined third reference pressure when a predetermined period has passed after the purge system pressure reaches the first reference pressure, wherein the third reference pressure is closer to the first reference pressure than to the second reference pressure.

6. The diagnosis apparatus according to claim 1, wherein the diagnosis means changes a threshold value that is used to distinguish a normal state from an abnormal state based on the status of the fuel vapor purge system or the engine.

7. The diagnosis apparatus according to claim 6, wherein the diagnosis means further measures a fluctuation level of the purge system pressure and changes the threshold value based on the fluctuation level.

8. The diagnosis apparatus according to claim 7, wherein the diagnosis means measures the fluctuation level of the purge system pressure while measuring the first and the second rates of pressure change.

9. The diagnosis apparatus according to claim 7, wherein the diagnosis means does not make the judgement when the fluctuation level of the purge system pressure is equal or greater than a predetermined value.

10. The diagnosis apparatus according to claim 6, wherein the diagnosis means further measures air flow rate in the air-intake passage and changes the threshold value based on the difference between the air flow rate before changing the purge system pressure by the pressure changing means and that after the purge system pressure is changed by the pressure changing means.

11. The diagnosis apparatus according to claim 6, wherein the diagnosis means changes the purge system pressure again and re-diagnoses the fuel vapor purge system if the diagnosis means has judged to defer the judgement after the diagnosis means changed the threshold value.

12. The diagnosis apparatus according to claim 1 further comprising a monitoring means for monitoring a condition under which the diagnosis by the diagnosis means is executed, wherein the monitoring means integrate a fluctuation level of the purge system pressure, and wherein the pressure changing means starts changing the purge system pressure and the diagnosis means starts diagnosing the purge system pressure when the integrated value of the fluctuation level is smaller than a predetermined set value.

13. The diagnosis apparatus according to claim 12, wherein the monitoring means changes the set value based on the level of a malfunction determined by the diagnosis apparatus.

14. The diagnosis apparatus according to claim 1, wherein the malfunction is a leak in the fuel vapor purge system.

15. A method for diagnosing whether a fuel vapor purge system has a malfunction, wherein the purge system includes a fuel tank for storing fuel and supplies fuel vapor from the tank to an air-intake passage of an engine, the method including:

changing purge system pressure in the fuel vapor purge system to a predetermined level;

closing the purge system after the purge system pressure reaches the first pressure value;

measuring a first rate of pressure change at a first reference pressure;

measuring a second rate of pressure change at a predetermined second reference pressure, wherein the second reference pressure differs from the first reference pressure, and wherein the second reference pressure is closer to the purge system pressure before the purge system pressure was changed to the predetermined level than the first reference pressure; and calculating a ratio of the first rate of pressure change to the second rate of pressure change.

16. The method according to claim 15 further including judging whether the fuel vapor purge system has a malfunction based on the ratio.

17. The method according to claim 15 further including:

measuring a fluctuation level of the purge system pressure while measuring the second rate of pressure change; and judging whether the fuel vapor purge system has a malfunction based on the second rate of pressure change and the measured fluctuation level.

18. A diagnosis apparatus for a fuel vapor purge system that includes a fuel tank for storing fuel and supplies fuel vapor from the tank to an air-intake passage of an engine, wherein the diagnosis apparatus determines whether the fuel vapor purge system has a malfunction, the apparatus comprising:

a pressure sensor for detecting purge system pressure in the fuel vapor purge system;

a valve for changing the purge system pressure to a predetermined level; and a computer for diagnosing the fuel vapor purge system, wherein the computer closes the fuel vapor purge system after the purge system pressure has been changed by using the valve, measuring a first rate of pressure change when the purge system pressure approaches a predetermined first reference pressure, and for measuring a second rate of pressure change when the purge system pressure approaches a predetermined second reference pressure, wherein the second reference pressure differs from the first reference pressure, and the second reference pressure value is closer to the purge system pressure before the purge system pressure was changed by using the valve than the first reference pressure, and wherein the computer judges whether the fuel vapor purge system has a malfunction based on the ratio of the first rate to the second rate.

* * * * *